(12) United States Patent
Li et al.

(10) Patent No.: US 11,372,208 B2
(45) Date of Patent: Jun. 28, 2022

(54) IMAGING LENS ASSEMBLY

(71) Applicant: Zhejiang Sunny Optical Co., Ltd, Ningbo (CN)

(72) Inventors: Ming Li, Ningbo (CN); Kaiyuan Zhang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 754 days.

(21) Appl. No.: 16/074,680

(22) PCT Filed: Oct. 23, 2017

(86) PCT No.: PCT/CN2017/107332
§ 371 (c)(1),
(2) Date: Aug. 1, 2018

(87) PCT Pub. No.: WO2018/218856
PCT Pub. Date: Dec. 6, 2018

(65) Prior Publication Data
US 2021/0055513 A1 Feb. 25, 2021

(30) Foreign Application Priority Data

May 27, 2017 (CN) .......................... 201710388372.X
May 27, 2017 (CN) .......................... 201720605343.X

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ....... G02B 9/60; G02B 13/0045; G02B 13/00
See application file for complete search history.

(56) References Cited

U.S. PATENT DOCUMENTS

| 9,575,290 B2 | 2/2017 | Kondo et al. |
| 2004/0190158 A1 | 9/2004 | Sato |

(Continued)

FOREIGN PATENT DOCUMENTS

| CN | 105259636 A | 1/2016 |
| CN | 105259640 | 1/2016 |

(Continued)

*Primary Examiner* — Stephone B Allen
*Assistant Examiner* — Gabriel A Sanz
(74) *Attorney, Agent, or Firm* — Hauptman Ham, LLP

(57) ABSTRACT

The present disclosure discloses an imaging lens assembly, along an optical axis from an object side to an imaging side including sequentially a first lens assembly and a second lens assembly. The first lens assembly has a positive refractive power and along the optical axis from the object side to the imaging side includes sequentially: a first lens, having a positive refractive power and its object-side surface is convex; a second lens, having a negative refractive power; and a third lens, having a positive refractive power or a negative refractive power. The second lens assembly has a negative refractive power and along the optical axis from the object side to the imaging side sequentially includes: a fourth lens, having a negative refractive power; and a fifth lens, having a positive refractive power or a negative refractive power and its object-side surface is convex at a paraxial position.

15 Claims, 12 Drawing Sheets

(56) References Cited

U.S. PATENT DOCUMENTS

| | | | | |
|---|---|---|---|---|
| 2013/0003193 A1* | 1/2013 | Huang | ............... | G02B 13/0045 |
| | | | | 359/713 |
| 2013/0021678 A1* | 1/2013 | Tsai | ................... | G02B 13/0045 |
| | | | | 359/714 |
| 2014/0285907 A1* | 9/2014 | Tang | .................. | G02B 13/0045 |
| | | | | 359/714 |
| 2018/0143402 A1* | 5/2018 | Lin | ...................... | G02B 27/646 |

FOREIGN PATENT DOCUMENTS

| | | |
|---|---|---|
| CN | 205229553 | 5/2016 |
| CN | 106646829 A | 5/2017 |
| CN | 106680974 A | 5/2017 |
| CN | 107065142 A | 8/2017 |

* cited by examiner

IMAGING LENS ASSEMBLY

RELATED APPLICATIONS

The present application is a National Phase of International Application Number PCT/CN2017/107332, filed Oct. 23, 2017, and claims the priority of China Application No. 201710388372.X, filed May 27, 2017; and China Application No. 201720605343.X, filed May 27, 2017.

TECHNICAL FIELD

The present disclosure relates to an imaging lens assembly, specifically to a miniaturized imaging lens assembly consisting of five lenses.

BACKGROUND

With the constant updating of consumer electronics, the quality of the imaging lens assemblies in the consumer electronics has become more and more important. In order to ensure the lightness and thinness of the electronic products, the lens assemblies need to be constantly miniaturized, and at the same time, conditions such as high pixel and high magnification need to be satisfied. With the proposing of the dual-camera concept, through the cooperation of a telephoto lens assembly and a wide-angle lens assembly, clear high-quality images may be obtained in both close-up and long shot views in the auto-focus state.

The present invention proposes a miniaturized imaging lens assembly having a good imaging quality, which may be applicable to portable electronic products.

SUMMARY

The technical solution provided by the present disclosure at least partially solves the technical problem described above.

According to an aspect, the present disclosure provides an imaging lens assembly. The imaging lens assembly along an optical axis from an object side to an imaging side may include sequentially a first lens assembly and a second lens assembly. The first lens assembly may have a positive refractive power; and the second lens assembly may have a negative refractive power. The first lens assembly along the optical axis from the object side to the imaging side may include sequentially a first lens, a second lens and a third lens, wherein the first lens may have a positive refractive power, and an object-side surface of the first lens is a convex surface; the second lens may have a negative refractive power; and the third lens may have a positive refractive power or a negative refractive power. The second lens assembly along the optical axis from the object side to the imaging side may include sequentially a fourth lens and a fifth lens, wherein the fourth lens may have a negative refractive power; and the fifth lens may have a positive refractive power or a negative refractive power, and an object-side surface of the fifth lens is a convex surface at a paraxial position. An effective focal length f of the imaging lens assembly and a combined focal length f45 of the fourth lens and the fifth lens may satisfy: $-1.0 \leq f/f45 \leq -0.5$, for example, $-0.78 \leq f/f45 \leq 0.58$.

According to another aspect, the present disclosure provides an imaging lens assembly. The imaging lens assembly along an optical axis from an object side to an imaging side may include sequentially a first lens assembly and a second lens assembly. The first lens assembly may have a positive refractive power; and the second lens assembly may have a negative refractive power. The first lens assembly along the optical axis from the object side to the imaging side may include sequentially a first lens, a second and a third lens, wherein the first lens may have a positive refractive power, and an object side surface of the first lens is a convex surface; the second lens may have a negative refractive power; and the third lens may have a positive refractive power or a negative refractive power. The second lens assembly along the optical axis from the object side to the imaging side may include sequentially a fourth lens and a fifth lens, wherein the fourth lens may have a negative refractive power; and the fifth lens may have a positive refractive power or a negative refractive power, and an object side surface of the fifth lens is a convex surface at a paraxial position. A distance BFL from an image-side surface of the fifth lens to an image plane on the optical axis and a distance TTL from the object-side surface of the first lens to the image plane on the optical axis may satisfy: $0.15 < BFL/TTL < 0.3$, for example, $0.19 \leq BFL/TTL \leq 0.25$.

According to another aspect, the present disclosure provides an imaging lens assembly. The imaging lens assembly along an optical axis from an object side to an imaging side may include sequentially a first lens assembly and a second lens assembly. The first lens assembly may have a positive refractive power; and the second lens assembly may have a negative refractive power. The first lens assembly along the optical axis from the object side to the imaging side may include sequentially a first lens, a second and a third lens, wherein the first lens may have a positive refractive power, and an object-side surface of the first lens is a convex surface; the second lens may have a negative refractive power; and the third lens may have a positive refractive power or a negative refractive power. The second lens assembly along the optical axis from the object side to the imaging side may include sequentially a fourth lens and a fifth lens, wherein the fourth lens may have a negative refractive power; and the fifth lens may have a positive refractive power or a negative refractive power, and an object-side surface of the fifth lens is a convex surface at a paraxial position. An effective focal length f of the imaging lens assembly and a distance TTL from the object-side surface of the first lens to an image plane on the optical axis may satisfy: $TTL/f < 1.0$, for example, $TTL/f \leq 0.97$.

According to implementations of the present disclosure, an effective focal length f2 of the second lens and an effective focal length f4 of the fourth lens may satisfy: $0.3 < f2/f4 < 1.0$, for example, $0.36 \leq f2/f4 \leq 0.62$.

According to the implementations of the present disclosure, a radius of curvature R3 of an object-side surface of the second lens and a radius of curvature R4 of an image-side surface of the second lens may satisfy: $-1.5 < R3/R4 < -0.5$, for example, $-1.06 \leq R3/R4 \leq -0.62$.

According to the implementations of the present disclosure, the effective focal length f of the imaging lens assembly and an effective focal length f3 of the third lens may satisfy: $|f/f3| < 0.5$, for example, $|f/f3| \leq 0.33$.

According to the implementations of the present disclosure, the effective focal length f of the imaging lens assembly and an effective focal length f5 of the fifth lens may satisfy: $|f/f5| < 0.5$, for example, $|f/f5| \leq 0.28$.

According to the implementations of the present disclosure, the effective focal length f of the imaging lens assembly and a radius of curvature R9 of the object-side surface of the fifth lens may satisfy: $f/R9 < 1.0$, for example, $f/R9 \leq 0.81$.

According to the implementations of the present disclosure, an air spacing T23 between the second lens and the third lens on the optical axis and an air spacing T34 between the third lens and the fourth lens on the optical axis may satisfy: T23/T34≤0.5, for example, T23/T34≤0.45.

In the present disclosure, several pieces (for example, five pieces) of lenses are used. By properly arranging the refractive power, surface type of each lens, and the axial spacing between lenses, the imaging lens assembly may have at least one of the beneficial effects of miniaturization, small field-of-view, high magnification, good image quality, low sensitivity and balanced aberration.

BRIEF DESCRIPTION OF THE DRAWINGS

The above and other advantages of implementations of the present disclosure will become apparent from the following detailed description with reference to the accompanying drawings, which are intended to illustrate the exemplary implementations of the present disclosure rather than limiting them. In the accompanying drawings.

DETAILED DESCRIPTION OF EMBODIMENTS

Figure 1:
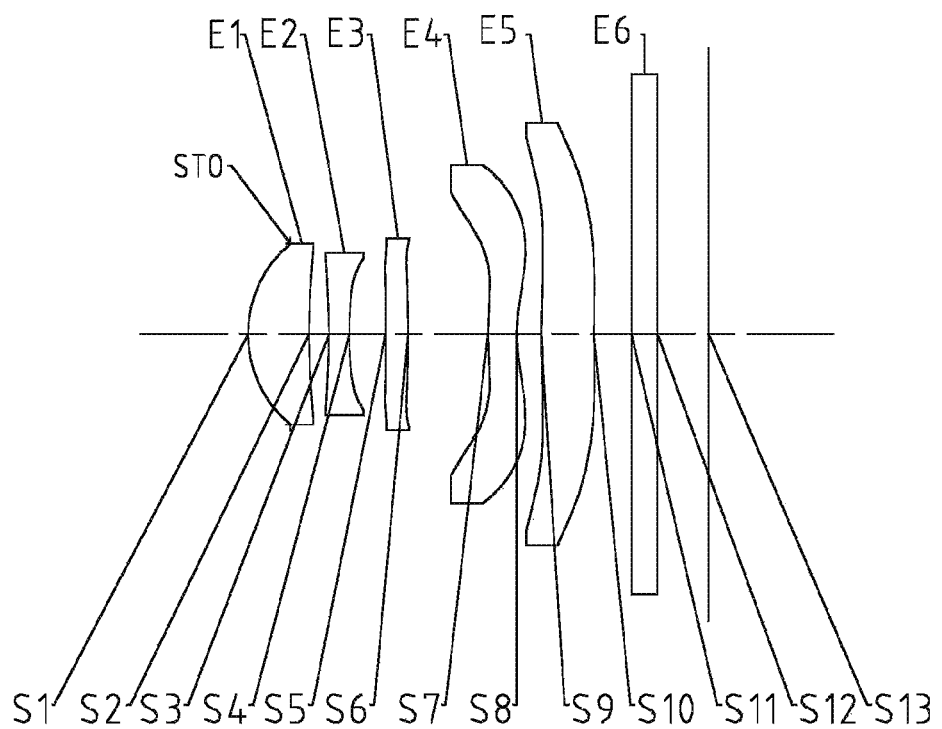
FIG. 1 illustrates a schematic structural view of an imaging lens assembly according to Embodiment 1 of the present disclosure.

For a better understanding of the present disclosure, various aspects of the present disclosure will be described in more detail with reference to the accompanying drawings. It should be understood that the detailed description is merely illustrative of the exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions "first, second, third and the like" are used only to distinguish one feature from another, without indicating any limitation to the feature. Thus, the first lens discussed below may also be referred to as the second lens or the third lens without departing from the teachings of the present disclosure.

In the accompanying drawings, the thickness, size and shape of the lens have been slightly exaggerated for the convenience of explanation. However, it should be understood that the size of the respective components are not limited by the accompanying drawings, but may be appropriately adjusted within a certain range. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area near the optical axis. The first lens is the lens closest to the object and the fifth lens is the lens closest to the photosensitive element. In this text, the surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual element in the list. Further, the use of "may", when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure will be described in detail below.

The present disclosure provides an imaging lens assembly. According to exemplary implementations of the present disclosure, the imaging lens assembly along an optical axis from an object side to an imaging side may be provided sequentially with a first lens assembly and a second lens assembly. In the exemplary implementations, the first lens assembly may have a positive refractive power, and the second lens assembly may have a negative refractive power.

In an exemplary implementation, the first lens assembly along the optical axis from the object side to the imaging side may be provided sequentially with a first lens, a second lens and a third lens. The second lens assembly along the optical axis from the object side to the imaging side may be provided sequentially with a fourth lens and a fifth lens.

In an exemplary implementation, the first lens may have a positive refractive power, and an object-side surface of the first lens is a convex surface; the second lens may have a negative refractive power; the third lens may optionally have a positive refractive power or a negative refractive power; the fourth lens may have a negative refractive power; and the fifth lens may optionally have a positive refractive power or a negative refractive power, and an object-side surface of the fifth lens is a convex surface at a paraxial position. By properly controlling the positive or negative distribution of the refractive power of the lenses in the system, low-order aberrations in the system may be effectively balanced and controlled, so that the system can obtain an excellent image quality. Through the above configuration, the first lens assembly and the second lens assembly form a telephoto lens assembly, and a small depth of field and a high magnification may be obtained, so that the imaging lens assembly has telephoto characteristics.

In an exemplary implementation, an effective focal length f of the imaging lens assembly and a combined focal length f45 of the fourth lens and the fifth lens may satisfy: $-1.0 \leq f/f45 \leq -0.5$, and more specifically, may satisfy: $-0.78 \leq f/f45 \leq -0.58$. By properly arranging the effective focal length f and the combined focal length f45, the refractive power of the first lens assembly may be effectively reduced, an high-order spherical aberration may be effectively reduced, and at the same time an high-order astigmatism may be balanced.

In an exemplary implementation, an effective focal length f2 of the second lens and an effective focal length f4 of the fourth lens may satisfy: $0.3 < f2/f4 < 1.0$, and more specifically, may satisfy: $0.36 \leq f2/f4 \leq 0.62$. By properly arranging the refractive power of the second lens and the fourth lens, an high-order coma aberration and an high-order astigmatism may be balanced.

In an exemplary implementation, a radius of curvature R3 of an object-side surface of the second lens and a radius of curvature R4 of an image-side surface of the second lens may satisfy: $-1.5 < R3/R4 < -0.5$, and more specifically, may satisfy: $-1.06 \leq R3/R4 \leq -0.62$. With such arrangement, an spherical aberration may be balanced, a coma aberration is reduced, and a large variation of the periphery slope is avoided, which further reduces the generation of stray light.

In an exemplary implementation, the effective focal length f of the imaging lens assembly and an effective focal length f3 of the third lens may satisfy: $|f/f3| < 0.5$, and more specifically, may satisfy: $|f/f3| \leq 0.33$. With such arrangement, the light deflection angle may be reduced, which corrects a lens assembly aberration, reduces a tolerance sensitivity, and avoids stray light.

In an exemplary implementation, the effective focal length f of the imaging lens assembly and an effective focal length f5 of the fifth lens may satisfy: $|f/f5| < 0.5$, and more specifically, may satisfy: $|f/f5| \leq 0.28$. With such arrangement, an astigmatism may be balanced, which improves an imaging quality and a CRA matching.

In an exemplary implementation, the effective focal length f of the imaging lens assembly and a radius of curvature R9 of the object-side surface of the fifth lens may satisfy: $f/R9 < 1.0$, and more specifically, may satisfy: $f/R9 \leq 0.81$. With such arrangement, an high-order coma aberration and an high-order astigmatism may be improved, which improves an image quality.

In an exemplary implementation, an air spacing T23 between the second lens and the third lens on the optical axis and an air spacing T34 between the third lens and the fourth lens on the optical axis may satisfy: $T23/T34 \leq 0.5$, and more specifically, may satisfy: $T23/T34 \leq 0.45$. With such arrangement, the light deflection angle may be reduced, which reduces an high-order aberration, improves an axial image quality, and reduces a sensitivity.

In an exemplary implementation, a distance BFL from an image-side surface of the fifth lens to an image plane on the optical axis and a distance TTL from the object-side surface of the first lens to the image plane on the optical axis may satisfy: $0.15 < BFL/TTL < 0.3$, and more specifically, may satisfy: $0.19 \leq BFL/TTL \leq 0.25$. With such arrangement, the lens assembly may be kept miniaturized, at the same time the interaction between the lens assembly and the motor and chip may be reduced, so that the appearance of the lens assembly is kept clean, and an optical effective surface is reduced.

In an exemplary implementation, the effective focal length f of the imaging lens assembly and the distance TTL from the object-side surface of the first lens to the image plane on the optical axis may satisfy: $TTL/f < 1.0$, and more specifically, may satisfy: $TTL/f \leq 0.97$. With such arrangement, the miniaturization of the telephoto lens assembly may be maintained, and a small field-of-view and high magnification are realized.

In an exemplary implementation, the imaging lens assembly system may also be provided with an aperture STO for limiting light beam, to adjust an amount of light entered. It should be understood by those skilled in the art that the aperture STO may be set at any position of the lens as needed, that is, the setting of the aperture STO should not be limited to the position shown in the accompanying drawings.

The optical imaging lens assembly according to the above implementations of the present disclosure may use several lenses, for example, five as used in the preceding text. By properly arranging the refractive power, surface type of each lens, the center thickness of each lens and the axial spacing between lenses, etc., it is possible to effectively enlarge the aperture of the optical imaging lens assembly system, reduce the system sensitivity, ensure the ultra-thin characteristic and miniaturization of the lens assembly, and improve the imaging quality, thus making the optical imaging lens assembly system more conducive to the production and processing and may be applicable to portable electronic products. In the implementations of the present disclosure, at least one of the mirror surfaces of the lenses is an aspheric mirror surface. The feature of the aspheric lens is: from the center of the lens to the periphery, the curvature is changing continuously. Unlike the spherical lens with a certain curvature from the center of the lens to the periphery, the aspheric lens has a better radius of curvature feature, which has an advantage of improving a distorted aberration and improving an astigmatic aberration, capable of making the field-of-view larger and more realistic. Using the aspheric lens, an aberration occurred at the time of imaging can be eliminated as much as possible, thereby improving the imaging quality. In addition, the use of the aspheric lens also may effectively reduce the number of lenses in the optical system.

However, it should be understood by those skilled in the art that the various results and advantages described below may be obtained by changing the constituting number of the lens assemblies without departing from the technical solution claimed by the present disclosure. For example, although five lenses are described as an example in the description of the first implementation, the imaging lens assembly is not limited to including five lenses. If desired, the imaging lens assembly may also include other numbers of lenses.

Specific embodiments of the imaging lens assembly that may be applied to the above-described implementations are further described below with reference to the accompanying drawings.

Embodiment 1

The imaging lens assembly according to Embodiment 1 of the above-described implementations of the present disclosure is described below with reference to FIG. 1 to FIG. 2D. FIG. 1 illustrates a schematic structural view of an imaging lens assembly according to Embodiment 1 of the present disclosure.

As shown in FIG. 1, the imaging lens assembly according to Embodiment 1 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side; and the second lens assembly includes a fourth lens E4 and a fifth lens E5 arranged in sequence along the optical axis from the object side to the imaging side. The first lens assembly may have a positive refractive power, and the second lens assembly may have a negative refractive power.

The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. In this embodiment, the first lens may have a positive refractive power, and the object-side surface of the first lens is a convex surface; the second lens may have a negative refractive power; the third lens may optionally have a positive refractive power or a negative refractive power; the fourth lens may have a negative refractive power; and the fifth lens may optionally have a positive refractive power or a negative refractive power, and the object-side surface of the fifth lens is a convex surface at a paraxial position. The imaging lens assembly may further be provided with an optical filter E6 having an object-side surface S11 and an image-side surface S12 for filtering out the infrared light. In the imaging lens assembly of the present embodiment, an aperture STO may also be provided to adjust the amount of light entered and improve the image quality of the system. Light from an object passes through the surfaces S1 to S12 sequentially and is finally imaged on the image plane 513.

Table 1 shows the surface type, the radius of curvature, the thickness, the material and the conic coefficient of each lens in Embodiment 1.

TABLE 1

| surface number | surface type | radius of curvature | thickness | material refraction index | material abbe number | conic coefficient |
|---|---|---|---|---|---|---|
| OBJ | spherical | infinite | infinite | | | |
| STO | spherical | infinite | −0.4866 | | | |
| S1 | aspheric | 1.3871 | 0.7019 | 1.55 | 56.1 | −9.1264 |
| S2 | aspheric | 9.6133 | 0.2325 | | | −16.8000 |
| S3 | aspheric | −5.3665 | 0.2330 | 1.64 | 23.5 | −2.6946 |
| S4 | aspheric | 6.1189 | 0.4177 | | | −4.0913 |
| S5 | aspheric | 14.8887 | 0.2592 | 1.67 | 20.4 | −0.0375 |
| S6 | aspheric | 230.6790 | 0.9207 | | | −16.8000 |
| S7 | aspheric | 3.5690 | 0.3310 | 1.55 | 56.1 | −16.8000 |
| S8 | aspheric | 1.8660 | 0.2825 | | | −6.7557 |
| S9 | aspheric | 8.5103 | 0.6096 | 1.64 | 23.5 | −1.1752 |
| S10 | aspheric | 12.5793 | 0.4339 | | | −6.0000 |
| S11 | spherical | infinite | 0.3000 | 1.52 | 64.2 | |
| S12 | spherical | infinite | 0.5900 | | | |
| S13 | spherical | infinite | | | | |

Referring to Table 1, the radius of curvature R3 of the object-side surface S3 of the second lens E2 and the radius of curvature R4 of the image-side surface S4 of the second lens E2 satisfy: R3/R4=−0.88; and the air spacing T23 between the second lens E2 and the third lens E3 on the optical axis and the air spacing T34 between the third lens E3 and the fourth lens E4 on the optical axis satisfy: T23/T34=0.45.

In this embodiment, five lenses are used as an example. By properly arranging the focal lengths and the surface types of the five lenses, the aperture of the lens assembly is effectively enlarged, the total length of the lens assembly is shortened, and the large aperture and the miniaturization of the lens assembly is ensured. At the same time, various types of aberrations are corrected, and the resolution and the image quality of the lens assembly are improved. The surface type x of each aspheric surface is defined by the following formula:

$$x = \frac{ch^2}{1+\sqrt{1-(k+1)c^2h^2}} + \sum Aih^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows high-order coefficients $A_4$, $A_6$, $A_8$, $A_{10}$, $A_{12}$, $A_{14}$ and $A_{16}$ applicable to each spherical or aspheric surface of each lens S1-S10 in Embodiment 1.

TABLE 2

| Surface number | A4 | A6 | A8 | A10 | A12 | A14 | A16 |
|---|---|---|---|---|---|---|---|
| S1 | 4.1590E−01 | −6.1728E−01 | 9.6355E−01 | −9.8614E−01 | 5.8615E−01 | −0.145221433 | 0 |
| S2 | −1.2034E−02 | 2.7259E−02 | 2.8481E−02 | −1.0015E−01 | 1.2624E−01 | −0.068926453 | 0 |
| S3 | 8.4089E−03 | 1.8618E−01 | −1.8103E−01 | −3.0275E−02 | 1.4363E−01 | −0.094734793 | 0 |
| S4 | 2.8567E−02 | 3.7633E−01 | −7.5548E−01 | 1.5246E+00 | −1.7883E+00 | 0.884106151 | 0 |
| S5 | −1.7781E−01 | 1.9272E−01 | −9.8119E−02 | 2.3987E−01 | −2.8074E−01 | 0.097636216 | 0 |
| S6 | −1.5903E−01 | 2.2526E−01 | −2.5529E−01 | 4.1229E−01 | −3.1672E−01 | 0.083066222 | 0 |
| S7 | −2.0534E−01 | 2.9911E−02 | 5.4869E−02 | 8.6485E−03 | −4.1934E−03 | 0.00056183 | 0 |
| S8 | −1.2732E−01 | 3.4079E−02 | −5.8550E−03 | −2.9483E−04 | 4.6048E−04 | −0.000113079 | 9.1232E−06 |
| S9 | −6.5236E−02 | 4.0104E−02 | −1.7119E−02 | 4.0871E−03 | −5.3463E−04 | 3.65912E−05 | −1.0572E−06 |
| S10 | −6.4868E−02 | 1.6621E−02 | 2.4095E−03 | −2.8267E−03 | 7.2712E−04 | −8.17E−05 | 3.5100E−06 |

Table 3 below shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of a maximum field-of-view HFOV of the imaging lens assembly of Embodiment 1

TABLE 3

| f1(mm) | 2.88 | f(mm) | 5.49 |
|---|---|---|---|
| f2(mm) | −4.40 | TTL(mm) | 5.31 |
| f3(mm) | 23.87 | HFOV(°) | 30.5 |
| f4(mm) | −7.69 | | |
| f5(mm) | 38.55 | | |

Referring to Table 1 and Table 3, it can be seen that the effective focal length f of the imaging lens assembly and the combined focal length f45 of the fourth lens E4 and the fifth lens E5 satisfy: f/f45=−0.58; the effective focal length f2 of the second lens E2 and the effective focal length f4 of the fourth lens E4 satisfy: f2/f4=0.57; the effective focal length f of the imaging lens assembly and the radius of curvature R9 of the object-side surface S9 of the fifth lens E5 satisfy: f/R9=0.65; the effective focal length f of the imaging lens assembly and the effective focal length f3 of the third lens E3 satisfy: |f/f3|=0.23; the effective focal length f of the imaging lens assembly and the effective focal length f5 of the fifth lens E5 satisfy: |f/f5|=0.14; the distance BFL from the image-side surface S10 of the fifth lens E5 to the image plane S13 on the optical axis and the distance TTL from the object-side surface S1 of the first lens E1 to the image plane S13 on the optical axis satisfy: BFL/TTL=0.25; and the effective focal length f of the imaging lens assembly and the distance TTL from the object-side surface S1 of the first lens E1 to the image plane S13 on the optical axis satisfy: TTL/f=0.97.

Figures 2A, 2B:
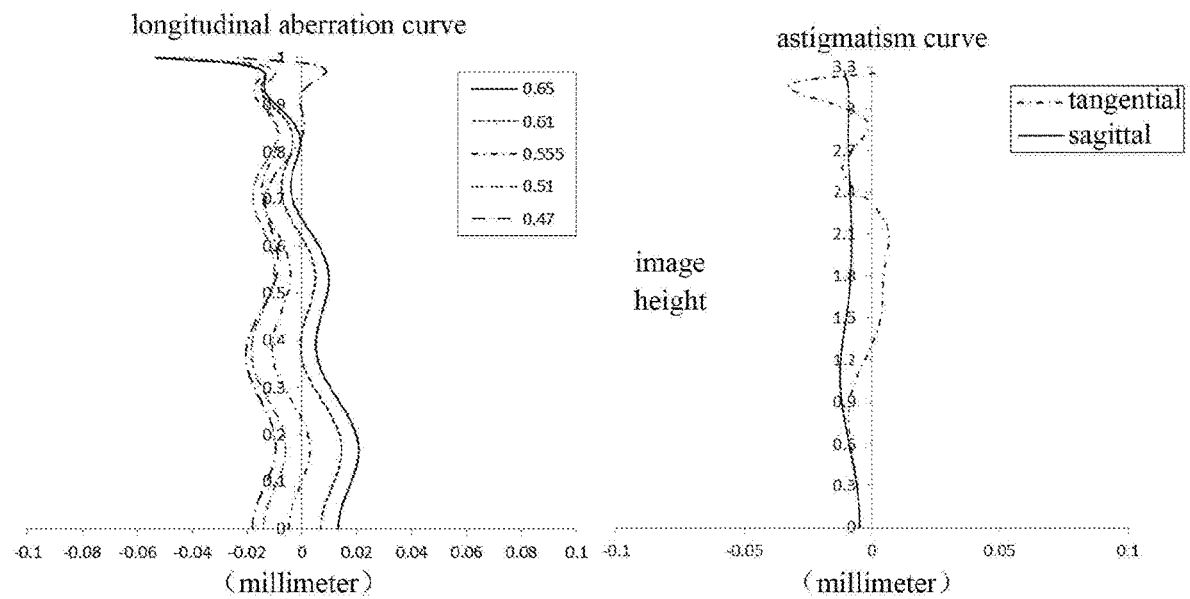
FIG. 2A illustrates a longitudinal aberration curve of the imaging lens assembly according to Embodiment 1.
FIG. 2B illustrates an astigmatism curve of the imaging lens assembly according to Embodiment 1.
Figures 2C, 2D:
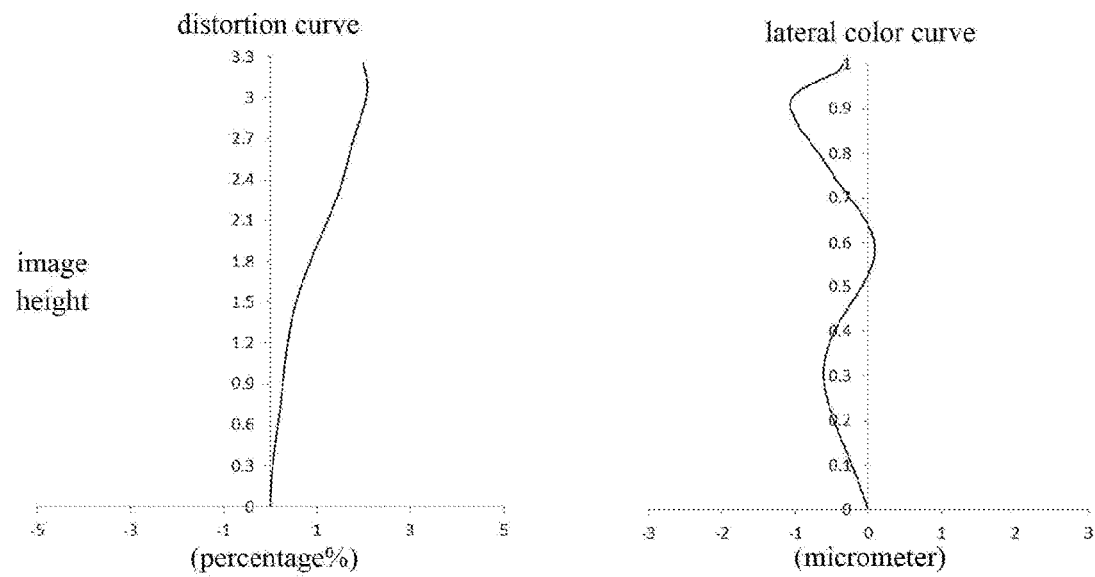
FIG. 2C illustrates a distortion curve of the imaging lens assembly according to Embodiment 1.
FIG. 2D illustrates a lateral color curve of the imaging lens assembly according to Embodiment 1.

FIG. 2A shows a longitudinal aberration curve of the imaging lens assembly according to Embodiment 1, representing deviations of focal points of light of different wavelengths converged after passing through an optical system. FIG. 2B shows an astigmatism curve of the imaging lens assembly according to Embodiment 1, representing a curvature of a tangential image plane and a curvature of a sagittal image plane. FIG. 2C shows a distortion curve of the imaging lens assembly according to Embodiment 1, representing amounts of distortion at different viewing angles. FIG. 2D shows a lateral color curve of the imaging lens assembly according to Embodiment 1, representing deviations of different image heights on an image plane after light passes through the imaging lens assembly. As described above and referring to FIGS. 2A to 2D, it can be seen that the imaging lens assembly according to Embodiment 1 can achieve the characteristics of miniaturization, good imaging quality, and low sensitivity.

Embodiment 2

The imaging lens assembly according to Embodiment 2 of the present disclosure is described below with reference to FIG. 3 to FIG. 4D. In addition to the parameters of the lenses of the imaging lens assembly, for example, in addition to the radius of curvature, thickness, conic coefficient, effective focal length, axial spacing, high-order coefficients of each mirror surface, and the like of the lenses, the imaging lens assembly described in the present Embodiment 2 and the following embodiments is the same in arrangement and structure as that of the imaging lens assembly described in Embodiment 1. For the purpose of brevity, the description of parts similar to those in Embodiment 1 will be omitted.

Figure 3:
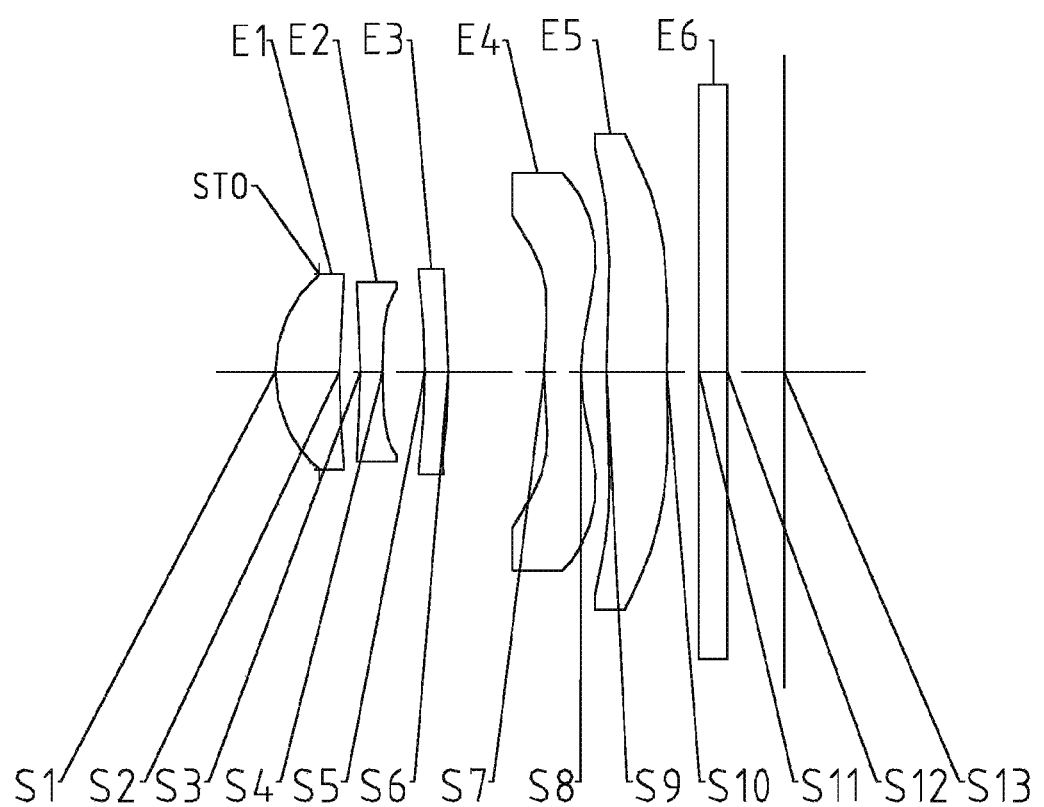
FIG. 3 illustrates a schematic structural view of an imaging lens assembly according to Embodiment 2 of the present disclosure.

FIG. 3 illustrates a schematic structural view of an imaging lens assembly according to Embodiment 2 of the present disclosure. As shown in FIG. 3, the imaging lens assembly according to Embodiment 2 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side, and the second lens assembly includes a fourth lens E4 and a fifth lens E5 arranged in sequence along the optical axis from the object side to the imaging side. Table 4 below shows the surface type, the radius of curvature, the thickness, the material and the conic coefficient of each lens in Embodiment 2. Table 5 shows high-order coefficients $A_4$, $A_6$, $A_8$, $A_{10}$, $A_{12}$, $A_{14}$, $A_{16}$, $A_{18}$ and $A_{20}$ applicable to each spherical or aspheric surface of each lens S1-S10 in Embodiment 2. Here, the respective aspheric surface types may be defined by the formula (1) given in the above Embodiment 1. Table 6 shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of the maximum field-of-view HFOV of the imaging lens assembly of Embodiment 2.

TABLE 4

| surface number | surface type | radius of curvature | thickness | material refraction index | material abbe number | conic coefficient |
|---|---|---|---|---|---|---|
| OBJ | spherical | infinite | infinite | | | |
| STO | spherical | infinite | −0.4587 | | | |
| S1 | aspheric | 1.3930 | 0.6708 | 1.55 | 56.1 | −8.9918 |
| S2 | aspheric | 9.7726 | 0.2194 | | | −37.3832 |
| S3 | aspheric | −5.2246 | 0.2300 | 1.64 | 23.5 | −4.4405 |
| S4 | aspheric | 8.4882 | 0.4425 | | | −17.1255 |
| S5 | aspheric | −16.9108 | 0.2442 | 1.67 | 20.4 | 99.0000 |
| S6 | aspheric | −12.0792 | 1.0002 | | | 52.7580 |
| S7 | aspheric | 3.2997 | 0.3812 | 1.55 | 56.1 | −12.9952 |
| S8 | aspheric | 1.8090 | 0.2706 | | | −4.8637 |
| S9 | aspheric | 7.7906 | 0.6292 | 1.64 | 23.5 | 3.2472 |
| S10 | aspheric | 9.8750 | 0.3320 | | | −28.0129 |
| S11 | spherical | infinite | 0.3000 | 1.52 | 64.2 | |
| S12 | spherical | infinite | 0.5900 | | | |
| S13 | spherical | infinite | | | | |

TABLE 5

| Surface number | A4 | A6 | A8 | A10 | A12 |
|---|---|---|---|---|---|
| S1 | 4.2050E−01 | −7.3219E−01 | 1.6805E+00 | −3.2484E+00 | 4.7493E+00 |
| S2 | −1.6798E−02 | 1.0165E−01 | −5.5495E−01 | 2.2228E+00 | −5.5595E+00 |
| S3 | 1.6283E−02 | 5.3669E−02 | 4.7048E−01 | −2.4870E+00 | 6.4952E+00 |
| S4 | 4.7864E−02 | 2.4123E−01 | −4.1962E−01 | 8.7440E−01 | −2.8650E−01 |
| S5 | −1.5759E−01 | 1.1379E−01 | −6.3794E−02 | 7.0193E−01 | −2.4291E+00 |
| S6 | −1.4668E−01 | 3.0739E−01 | −9.7818E−01 | 3.0271E+00 | −5.8956E+00 |
| S7 | −1.4538E−01 | 1.0646E−04 | 3.2207E−02 | −3.9778E−01 | 3.7602E−02 |
| S8 | −9.3019E−02 | 1.6767E−02 | 2.0125E−03 | −9.2111E−04 | −1.9679E−03 |
| S9 | −6.1503E−02 | 3.1835E−02 | −7.2630E−03 | −2.2901E−03 | 1.8182E−03 |
| S10 | −6.8956E−02 | 2.6831E−02 | −9.8077E−03 | 4.9309E−03 | −2.1351E−03 |

| Surface number | A14 | A16 | A18 | A20 |
|---|---|---|---|---|
| S1 | −4.7776E+00 | 3.0649E+00 | −1.1108E+00 | 1.7075E−01 |
| S2 | 8.7348E+00 | −8.4115E+00 | 4.5437E+00 | −1.0592E+00 |
| S3 | −1.0364E+01 | 1.0001E+01 | −5.3293E+00 | 1.1883E+00 |
| S4 | −3.4161E+00 | 8.6059E+00 | −8.6053E+00 | 3.3036E+00 |
| S5 | 4.6734E+00 | −5.2284E+00 | 3.1336E+00 | −7.7553E−01 |
| S6 | 7.3616E+00 | −5.7081E+00 | 2.4895E+00 | −4.6630E−01 |
| S7 | −2.0688E−02 | 6.2202E−03 | −9.4020E−04 | 5.42048E−05 |
| S8 | 1.6298E−03 | −5.3021E−04 | 8.1029E−05 | −4.8272E−06 |
| S9 | −4.5900E−04 | 5.4936E−05 | −2.7631E−06 | 1.9396E−08 |
| S10 | 5.6256E−04 | −8.4676E−05 | 6.8050E−06 | −2.2856E−07 |

TABLE 6

| f1(mm) | 2.89 | f(mm) | 5.48 |
|---|---|---|---|
| f2(mm) | −4.99 | TTL(mm) | 5.31 |
| f3(mm) | 62.25 | HFOV(°) | 30.7 |
| f4(mm) | −8.06 | | |
| f5(mm) | 51.29 | | |

Figure 4A:
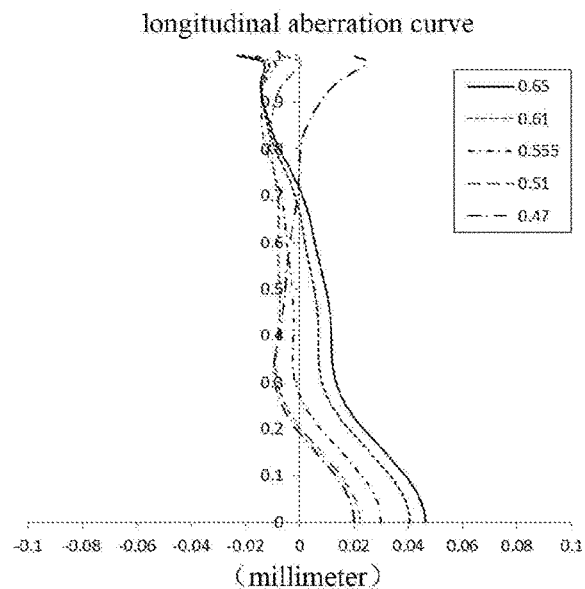
FIG. 4A illustrates a longitudinal aberration curve of the imaging lens assembly according to Embodiment 2.
Figure 4B:
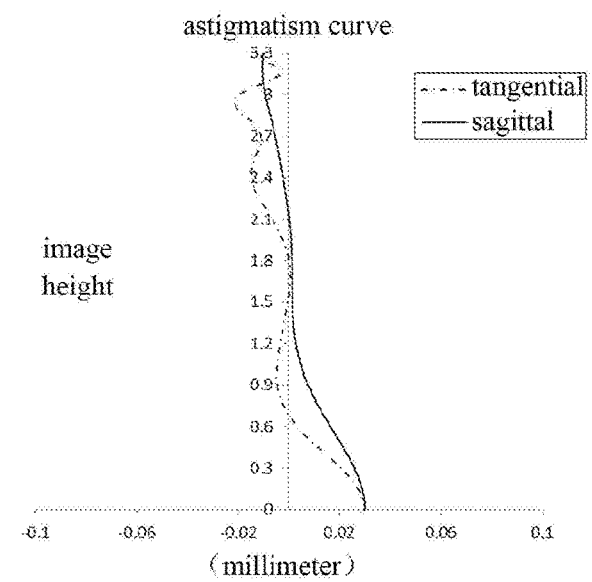
FIG. 4B illustrates an astigmatism curve of the imaging lens assembly according to Embodiment 2.
Figure 4C:
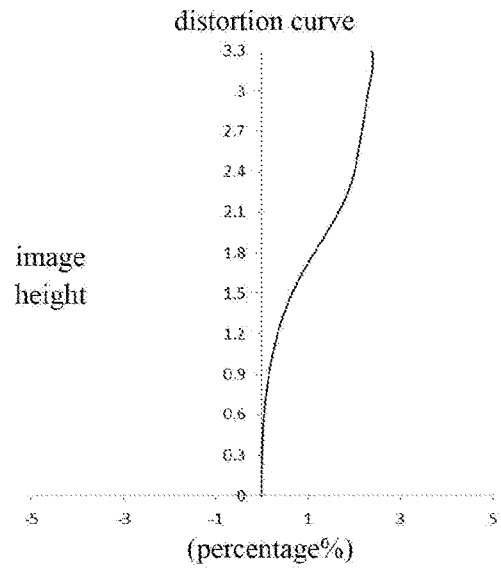
FIG. 4C illustrates a distortion curve of the imaging lens assembly according to Embodiment 2.
Figure 4D:
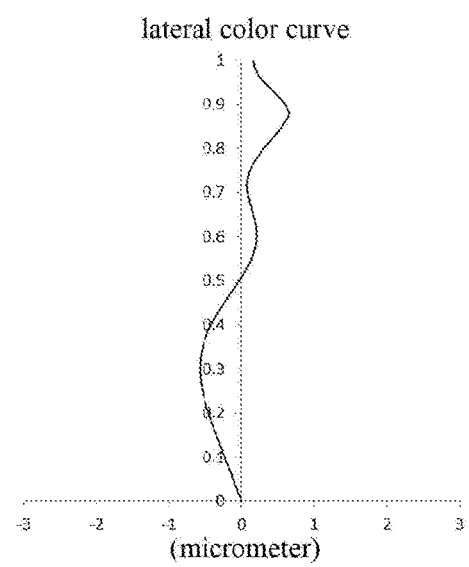
FIG. 4D illustrates a lateral color curve of the imaging lens assembly according to Embodiment 2.

FIG. 4A shows a longitudinal aberration curve of the imaging lens assembly according to Embodiment 2, representing deviations of focal points of light of different wavelengths converged after passing through an optical system. FIG. 4B shows an astigmatism curve of the imaging lens assembly according to Embodiment 2, representing a curvature of a tangential image plane and a curvature of a sagittal image plane. FIG. 4C shows a distortion curve of the imaging lens assembly according to Embodiment 2, representing amounts of distortion at different viewing angles. FIG. 4D shows a lateral color curve of the imaging lens assembly according to Embodiment 2, representing deviations of different image heights on an image plane after light passes through the imaging lens assembly. As described above and referring to FIGS. 4A to 4D, it can be seen that the imaging lens assembly according to Embodiment 2 can achieve the characteristics of miniaturization, good imaging quality, and low sensitivity.

Embodiment 3

Figure 5:
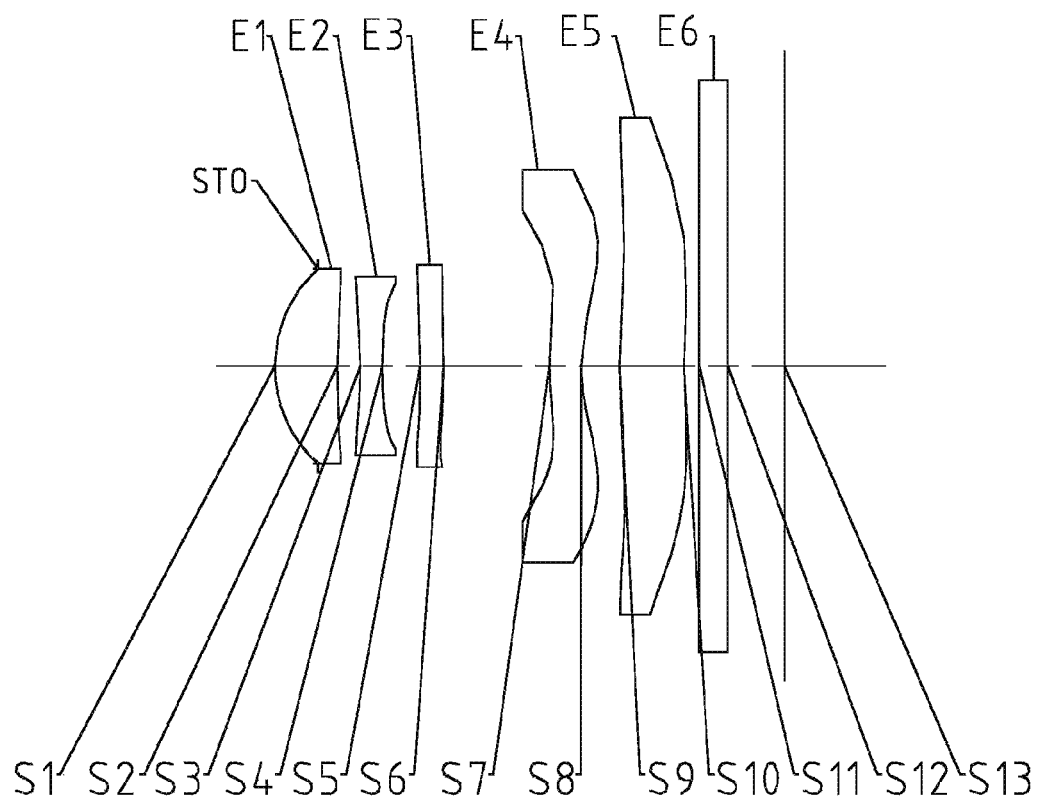
FIG. 5 illustrates a schematic structural view of an imaging lens assembly according to Embodiment 3 of the present disclosure.

The imaging lens assembly according to Embodiment 3 of the present disclosure is described below with reference to FIG. 5 to FIG. 6D. FIG. 5 illustrates a schematic structural view of an imaging lens assembly according to Embodiment 3 of the present disclosure. As shown in FIG. 5, the imaging lens assembly according to Embodiment 3 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side, and the second lens assembly includes a fourth lens E4 and a fifth lens E5 arranged in sequence along the optical axis from the object side to the imaging side.

Table 7 below shows the surface type, the radius of curvature, the thickness, the material and the conic coefficient of each lens in Embodiment 3. Table 8 shows high-order coefficients $A_4, A_6, A_8, A_{10}, A_{12}, A_{14}, A_{16}, A_{16}$ and $A_{20}$ applicable to each spherical or aspheric surface of each lens S1-S10 in Embodiment 3. Here, the respective aspheric surface forms may be defined by the formula (1) given in the above Embodiment 1. Table 9 shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of the maximum field-of-view HFOV of the imaging lens assembly of Embodiment 3.

TABLE 7

| surface number | surface type | radius of curvature | thickness | material refraction index | material abbe number | conic coefficient |
|---|---|---|---|---|---|---|
| OBJ | spherical | infinite | infinite | | | |
| STO | spherical | infinite | −0.4467 | | | |
| S1 | aspheric | 1.4176 | 0.6516 | 1.55 | 56.1 | −9.3276 |
| S2 | aspheric | 14.5256 | 0.2400 | | | −9.2723 |
| S3 | aspheric | −4.7525 | 0.2300 | 1.64 | 23.5 | −3.5309 |
| S4 | aspheric | 6.5742 | 0.3914 | | | −68.8602 |
| S5 | aspheric | 98.8112 | 0.2453 | 1.67 | 20.4 | 99.0000 |
| S6 | aspheric | −17.7488 | 1.1026 | | | −99.0000 |
| S7 | aspheric | 3.0940 | 0.3295 | 1.55 | 56.1 | −4.8850 |
| S8 | aspheric | 1.7967 | 0.4008 | | | −4.0933 |
| S9 | aspheric | 6.7764 | 0.6713 | 1.64 | 23.5 | 0.7072 |
| S10 | aspheric | 5.7983 | 0.1574 | | | −69.6997 |
| S11 | spherical | infinite | 0.3000 | 1.52 | 64.2 | |
| S12 | spherical | infinite | 0.5900 | | | |
| S13 | spherical | infinite | | | | |

TABLE 8

| Surface number | A4 | A6 | A8 | A10 | A12 |
|---|---|---|---|---|---|
| S1 | 4.1524E−01 | −7.4419E−01 | 1.7702E+00 | −3.5984E+00 | 5.5755E+00 |
| S2 | −1.2009E−02 | 7.8011E−02 | −3.7994E−01 | 1.4119E+00 | −3.3864E+00 |
| S3 | 1.1402E−02 | 8.0007E−02 | 2.3759E−01 | −1.5432E+00 | 4.0190E+00 |
| S4 | 4.2995E−02 | 2.4061E−01 | −6.5634E−01 | 2.3092E+00 | −5.6113E+00 |
| S5 | −1.5521E−01 | 1.2099E−01 | −2.4229E−01 | 1.2642E+00 | −3.4602E+00 |
| S6 | −1.1632E−01 | 1.9477E−01 | −5.6898E−01 | 1.8268E+00 | −3.5506E+00 |
| S7 | −1.4945E−01 | 3.1875E−02 | −4.9977E−02 | 6.8214E−02 | −5.2352E−02 |
| S8 | −8.3742E−02 | 1.7280E−02 | −1.4135E−02 | 1.7387E−02 | −1.2299E−02 |
| S9 | −6.0152E−02 | 3.8631E−02 | −1.7097E−02 | 4.8801E−03 | −1.0592E−03 |
| S10 | −4.3112E−02 | 7.3788E−03 | −3.2209E−04 | 5.4347E−04 | −3.6486E−04 |

| Surface number | A14 | A16 | A18 | A20 |
|---|---|---|---|---|
| S1 | −6.0101E+00 | 4.1924E+00 | −1.6897E+00 | 2.9883E−01 |
| S2 | 5.1703E+00 | −4.8537E+00 | 2.5573E+00 | −5.7914E−01 |
| S3 | −6.0205E+00 | 5.2959E+00 | −2.5166E+00 | 4.8710E−01 |
| S4 | 8.9388E+00 | −8.4466E+00 | 4.2247E+00 | −7.8311E−01 |
| S5 | 6.0226E+00 | −6.3983E+00 | 3.7362E+00 | −9.2208E−01 |
| S6 | 4.4791E+00 | −3.5315E+00 | 1.5692E+00 | −3.0249E−01 |
| S7 | 2.6280E−02 | −8.3396E−03 | 1.4965E−03 | −1.1546E−04 |
| S8 | 4.9697E−03 | −1.1495E−03 | 1.4217E−04 | −7.3182E−06 |
| S9 | 1.9681E−04 | −2.7825E−05 | 2.3684E−06 | −8.6669E−08 |
| S10 | 9.1289E−05 | −1.1142E−05 | 6.7297E−07 | −1.6184E−08 |

TABLE 9

| f1(mm) | 2.83 | f(mm) | 5.48 |
|---|---|---|---|
| f2(mm) | −4.25 | TTL(mm) | 5.31 |
| f3(mm) | 22.62 | HFOV(°) | 30.6 |
| f4(mm) | −8.62 | | |
| f5(mm) | −85.37 | | |

Figure 6A:
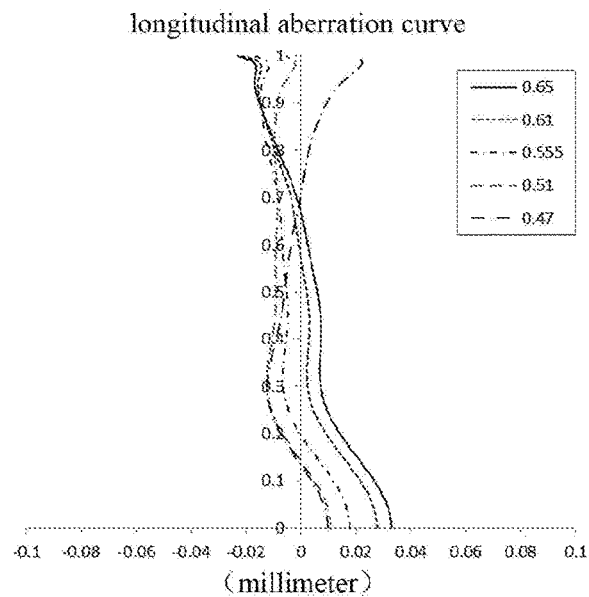
FIG. 6A illustrates a longitudinal aberration curve of the imaging lens assembly according to Embodiment 3.
Figure 6B:
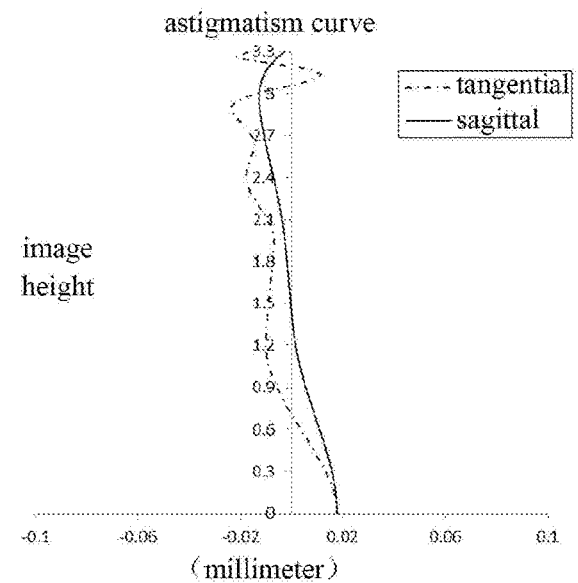
FIG. 6B illustrates an astigmatism curve of the imaging lens assembly according to Embodiment 3.
Figure 6C:
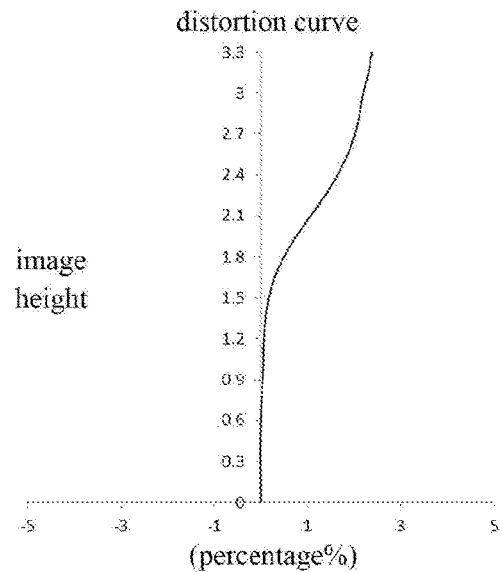
FIG. 6C illustrates a distortion curve of the imaging lens assembly according to Embodiment 3.
Figure 6D:
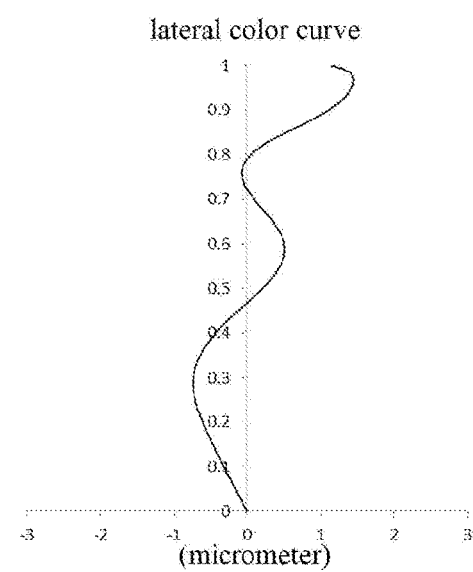
FIG. 6D illustrates a lateral color curve of the imaging lens assembly according to Embodiment 3.

FIG. 6A shows a longitudinal aberration curve of the imaging lens assembly according to Embodiment 3, representing deviations of focal points of light of different wavelengths converged after passing through an optical system. FIG. 6B shows an astigmatism curve of the imaging lens assembly according to Embodiment 3, representing a curvature of a tangential image plane and a curvature of a sagittal image plane. FIG. 6C shows a distortion curve of the imaging lens assembly according to Embodiment 3, representing amounts of distortion at different viewing angles. FIG. 6D shows a lateral color curve of the imaging lens assembly according to Embodiment 3, representing deviations of different image heights on an image plane after light passes through the imaging lens assembly. As described above and referring to FIGS. 6A to 6D, it can be seen that the imaging lens assembly according to Embodiment 3 can achieve the characteristics of miniaturization, good imaging quality, and low sensitivity.

Embodiment 4

Figure 7:
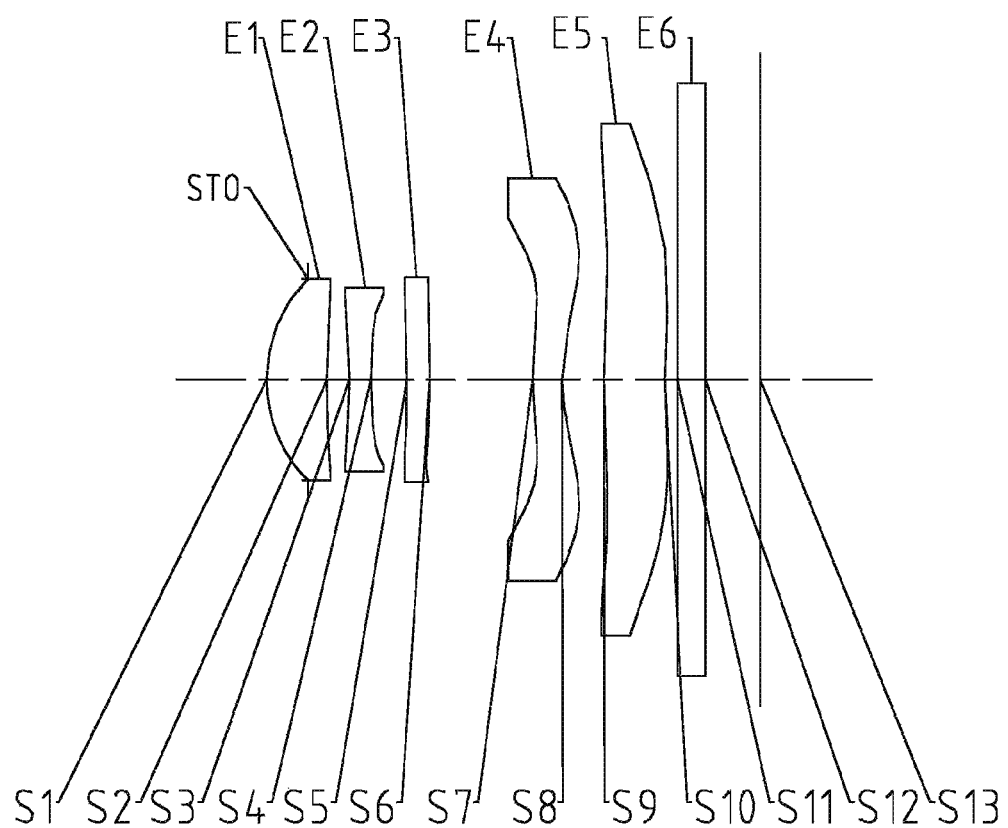
FIG. 7 illustrates a schematic structural view of an imaging lens assembly according to Embodiment 4 of the present disclosure.

The imaging lens assembly according to Embodiment 4 of the present disclosure is described below with reference to FIG. 7 to FIG. 8D. FIG. 7 illustrates a schematic structural view of an imaging lens assembly according to Embodiment 4 of the present disclosure. As shown in FIG. 7, the imaging lens assembly according to Embodiment 4 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side, and the second lens assembly includes a fourth lens E4 and a fifth lens E5 arranged in sequence along the optical axis from the object side to the imaging side.

Table 10 below shows the surface type, the radius of curvature, the thickness, the material and the conic coefficient of each lens in Embodiment 4. Table 11 shows high-order coefficients $A_4, A_6, A_8, A_{10}, A_{12}, A_{14}, A_{16}, A_{18}$ and $A_{20}$ applicable to each spherical or aspheric surface of each lens S1-S10 in Embodiment 4. Here, the respective aspheric surface forms may be defined by the formula (1) given in the above Embodiment 1. Table 12 shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of the maximum field-of-view HFOV of the imaging lens assembly of Embodiment 4

TABLE 10

| surface number | surface type | radius of curvature | thickness | material refraction index | abbe number | conic coefficient |
|---|---|---|---|---|---|---|
| OBJ | spherical | infinite | infinite | | | |
| STO | spherical | infinite | −0.4436 | | | |
| S1 | aspheric | 1.4260 | 0.6486 | 1.55 | 56.1 | −9.4130 |
| S2 | aspheric | 14.9620 | 0.2431 | | | 5.7434 |
| S3 | aspheric | −4.8389 | 0.2300 | 1.64 | 23.5 | −2.5186 |
| S4 | aspheric | 6.2099 | 0.3868 | | | −73.3485 |
| S5 | aspheric | 65.8742 | 0.2466 | 1.67 | 20.4 | 99.0000 |
| S6 | aspheric | −16.7642 | 1.1064 | | | −99.0000 |
| S7 | aspheric | 2.8838 | 0.3174 | 1.55 | 56.1 | −4.2644 |
| S8 | aspheric | 1.7797 | 0.4498 | | | −3.8891 |
| S9 | aspheric | 7.5085 | 0.6551 | 1.64 | 23.5 | 2.2799 |
| S10 | aspheric | 5.5986 | 0.1362 | | | −71.0811 |
| S11 | spherical | infinite | 0.3000 | 1.52 | 64.2 | |
| S12 | spherical | infinite | 0.5900 | | | |
| S13 | spherical | infinite | | | | |

TABLE 11

| Surface number | A4 | A6 | A8 | A10 | A12 |
|---|---|---|---|---|---|
| S1 | 4.1168E−01 | −7.3665E−01 | 1.7487E+00 | −3.5538E+00 | 5.5163E+00 |
| S2 | −1.0317E−02 | 7.2165E−02 | −3.4916E−01 | 1.2846E+00 | −3.0510E+00 |
| S3 | 1.3172E−02 | 7.2797E−02 | 2.0940E−01 | −1.3656E+00 | 3.5371E+00 |
| S4 | 5.0700E−02 | 2.0417E−01 | −5.4719E−01 | 1.8994E+00 | 4.4621E+00 |
| S5 | −1.4561E−01 | 1.1719E−01 | −2.5713E−01 | 1.2581E+00 | −3.3013E+00 |
| S6 | −1.0628E−01 | 1.7413E−01 | −4.8834E−01 | 1.5359E+00 | −2.8920E+00 |
| S7 | −1.4188E−01 | 2.5341E−02 | −4.6865E−02 | 6.6386E−02 | −5.0989E−02 |
| S8 | −7.9348E−02 | 1.1092E−02 | −1.0635E−02 | 1.6300E−02 | −1.2087E−02 |
| S9 | −6.3294E−02 | 4.1487E−02 | −1.8660E−02 | 5.4822E−03 | −1.2260E−03 |
| S10 | −4.2359E−02 | 5.2242E−03 | 1.6123E−03 | −7.6425E−04 | 1.5964E−04 |

| Surface number | A14 | A16 | A18 | A20 |
|---|---|---|---|---|
| S1 | −5.9680E+00 | 4.1859E+00 | −1.6995E+00 | 3.0346E−01 |
| S2 | 4.6162E+00 | −4.2951E+00 | 2.2432E+00 | −5.0330E−01 |
| S3 | −5.2542E+00 | 4.5733E+00 | −2.1455E+00 | 4.0801E−01 |
| S4 | 6.8427E+00 | −6.1422E+00 | 2.8439E+00 | −4.4810E−01 |
| S5 | 5.5925E+00 | −5.8305E+00 | 3.3563E+00 | −8.1976E−01 |
| S6 | 3.5600E+00 | −2.7560E+00 | 1.2084E+00 | −2.3179E−01 |
| S7 | 2.4959E−02 | −7.5636E−03 | 1.2831E−03 | −9.3491E−05 |
| S8 | 4.9106E−03 | −1.1299E−03 | 1.3884E−04 | −7.1158E−06 |
| S9 | 2.2756E−04 | −3.1242E−05 | 2.5706E−06 | −9.1493E−08 |
| S10 | −2.9569E−05 | 4.7795E−06 | −4.4546E−07 | 1.6349E−08 |

TABLE 12

| f1(mm) | 2.84 | f(mm) | 5.48 |
|---|---|---|---|
| f2(mm) | −4.19 | TTL(mm) | 5.31 |
| f3(mm) | 20.10 | HFOV(°) | 30.6 |
| f4(mm) | −9.48 | | |
| f5(mm) | −39.51 | | |

Figure 8A:
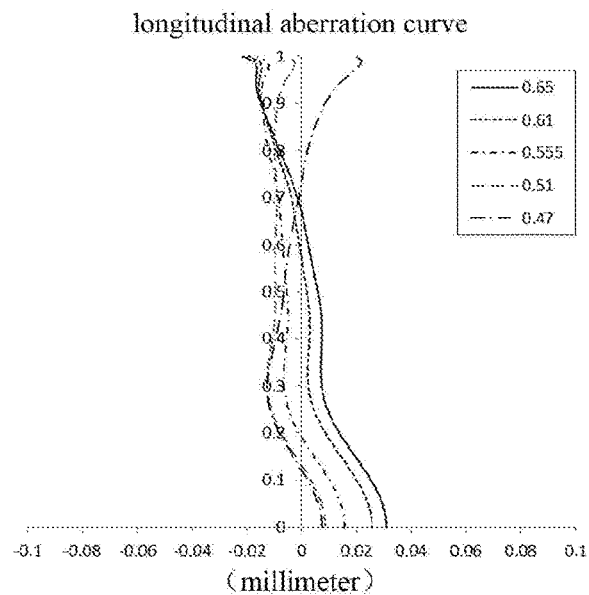
FIG. 8A illustrates a longitudinal aberration curve of the imaging lens assembly according to Embodiment 4.
Figure 8B:
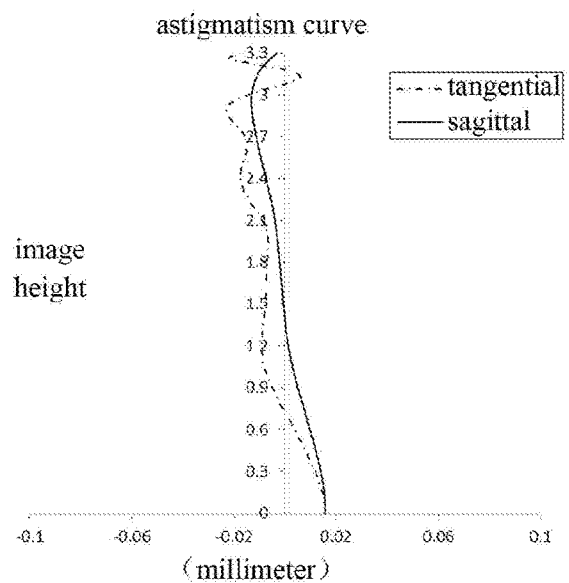
FIG. 8B illustrates an astigmatism curve of the imaging lens assembly according to Embodiment 4.
Figure 8C:
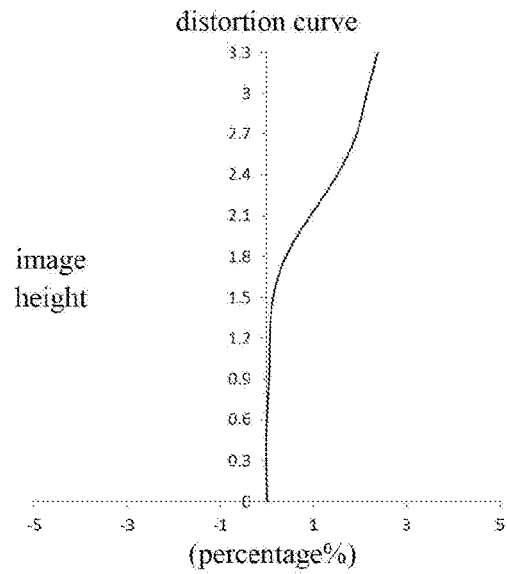
FIG. 8C illustrates a distortion curve of the imaging lens assembly according to Embodiment 4.
Figure 8D:
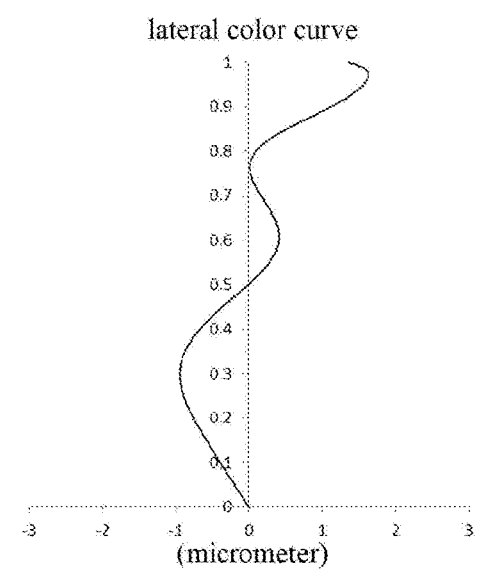
FIG. 8D illustrates a lateral color curve of the imaging lens assembly according to Embodiment 4.

FIG. 8A shows a longitudinal aberration curve of the imaging lens assembly according to Embodiment 4, representing deviations of focal points of light of different wavelengths converged after passing through an optical system. FIG. 8B shows an astigmatism curve of the imaging lens assembly according to Embodiment 4, representing a curvature of a tangential image plane and a curvature of a sagittal image plane. FIG. 8C shows a distortion curve of the imaging lens assembly according to Embodiment 4, representing amounts of distortion at different viewing angles. FIG. 8D shows a lateral color curve of the imaging lens assembly according to Embodiment 4, representing deviations of different image heights on an image plane after light passes through the imaging lens assembly. As described above and referring to FIGS. 8A to 8D, it can be seen that the imaging lens assembly according to Embodiment 4 can achieve the characteristics of miniaturization, good imaging quality, and low sensitivity.

Embodiment 5

Figure 9:
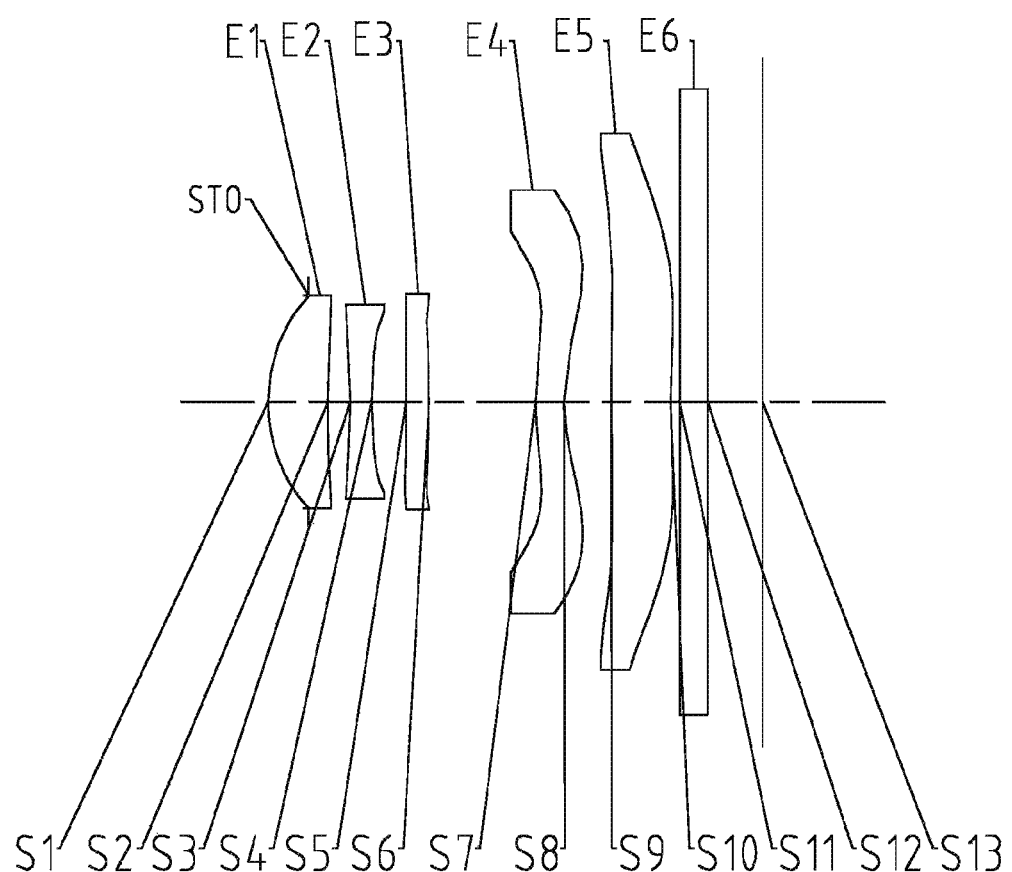
FIG. 9 illustrates a schematic structural view of an imaging lens assembly according to Embodiment 5 of the present disclosure.

The imaging lens assembly according to Embodiment 5 of the present disclosure is described below with reference to FIG. 9 to FIG. 10D. FIG. 9 illustrates a schematic structural view of an imaging lens assembly according to Embodiment 5 of the present disclosure. As shown in FIG. 9, the imaging lens assembly according to Embodiment 5 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side, and the second lens assembly includes a fourth lens E4 and a fifth lens E5 arranged in sequence along the optical axis from the object side to the imaging side.

Table 13 below shows the surface type, the radius of curvature, the thickness, the material and the conic coefficient of each lens in Embodiment 5. Table 14 shows high-order coefficients $A_4, A_6, A_8, A_{10}, A_{12}, A_{14}, A_{16}, A_{16}$ and $A_{20}$ applicable to each spherical or aspheric surface of each lens S1-S10 in Embodiment 5. Here, the respective aspheric surface forms may be defined by the formula (1) given in the above Embodiment 1. Table 15 shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of the maximum field-of-view HFOV of the imaging lens assembly of Embodiment 5.

TABLE 13

| surface number | surface type | radius of curvature | thickness | material refraction index | abbe number | conic coefficient |
|---|---|---|---|---|---|---|
| OBJ | spherical | infinite | infinite | | | |
| STO | spherical | infinite | −0.4350 | | | |
| S1 | aspheric | 1.4468 | 0.6411 | 1.55 | 56.1 | −9.5666 |
| S2 | aspheric | 16.9573 | 0.2419 | | | 54.5977 |
| S3 | aspheric | −5.2708 | 0.2300 | 1.64 | 23.5 | −0.4469 |
| S4 | aspheric | 5.4463 | 0.3684 | | | −75.4275 |
| S5 | aspheric | 27.5825 | 0.2454 | 1.67 | 20.4 | 99.0000 |
| S6 | aspheric | −20.9651 | 1.1456 | | | −99.0000 |
| S7 | aspheric | 2.6105 | 0.3058 | 1.55 | 56.1 | −4.3761 |
| S8 | aspheric | 1.7377 | 0.5092 | | | −3.3809 |
| S9 | aspheric | 9.3133 | 0.6346 | 1.64 | 23.5 | −0.2454 |
| S10 | aspheric | 5.5519 | 0.0980 | | | −89.0653 |
| S11 | spherical | infinite | 0.3000 | 1.52 | 64.2 | |
| S12 | spherical | infinite | 0.5900 | | | |
| S13 | spherical | infinite | | | | |

TABLE 14

| Surface number | A4 | A6 | A8 | A10 | A12 |
|---|---|---|---|---|---|
| S1 | 4.0041E−01 | −7.0749E−01 | 1.6547E+00 | −3.3189E+00 | 5.0945E+00 |
| S2 | −6.4119E−03 | 6.5443E−02 | −3.1897E−01 | 1.1579E+00 | −2.7161E+00 |
| S3 | 1.4802E−02 | 7.1979E−02 | 9.8156E−02 | −8.4583E−01 | 2.2316E+00 |
| S4 | 6.4560E−02 | 1.4448E−01 | −4.5426E−01 | 1.7448E+00 | −4.3049E+00 |
| S5 | −1.2953E−01 | 1.1317E−01 | −2.3798E−01 | 1.0348E+00 | −2.4820E+00 |
| S6 | −8.4495E−02 | 1.3325E−01 | −2.9341E−01 | 8.5003E−01 | −1.3964E+00 |
| S7 | −1.1744E−01 | 4.2185E−03 | −5.5100E−03 | 1.4401E−02 | −7.3035E−03 |
| S8 | −7.1518E−02 | −3.1682E−03 | 4.3115E−03 | 4.8771E−03 | −5.9242E−03 |
| S9 | −7.0617E−02 | 4.8901E−02 | −2.3719E−02 | 8.4964E−03 | −2.4257E−03 |
| S10 | −4.1002E−02 | −1.5550E−03 | 7.8805E−03 | 4.5865E−03 | 1.5902E−03 |

| Surface number | A14 | A16 | A18 | A20 |
|---|---|---|---|---|
| S1 | −5.4596E+00 | 3.7986E+00 | −1.5318E+00 | 2.7199E−01 |
| S2 | 4.0619E+00 | −3.7367E+00 | 1.9299E+00 | 4.2823E−01 |
| S3 | −3.2583E+00 | 2.7343E+00 | −1.2101E+00 | 2.0754E−01 |
| S4 | 6.9228E+00 | −6.7009E+00 | 3.5536E+00 | −7.6807E−01 |
| S5 | 4.0052E+00 | 4.0925E+00 | 2.3475E+00 | −5.7843E−01 |
| S6 | 1.5454E+00 | −1.1279E+00 | 4.9236E−01 | −1.0127E−01 |
| S7 | 4.1080E−04 | 1.0007E−03 | −3.5066E−04 | 3.5649E−05 |
| S8 | 2.6387E−03 | −6.1343E−04 | 7.5367E−05 | −3.9200E−06 |
| S9 | 5.1180E−04 | −6.9877E−05 | 5.3706E−06 | −1.7602E−07 |
| S10 | −3.4679E−04 | 4.5494E−05 | −3.2388E−06 | 9.5452E−08 |

TABLE 15

| f1(mm) | 2.86 | f(mm) | 5.48 |
|---|---|---|---|
| f2(mm) | −4.13 | TTL(mm) | 5.31 |
| f3(mm) | 17.93 | HFOV(°) | 30.6 |
| f4(mm) | −10.86 | | |
| f5(mm) | −22.87 | | |

Figure 10A:
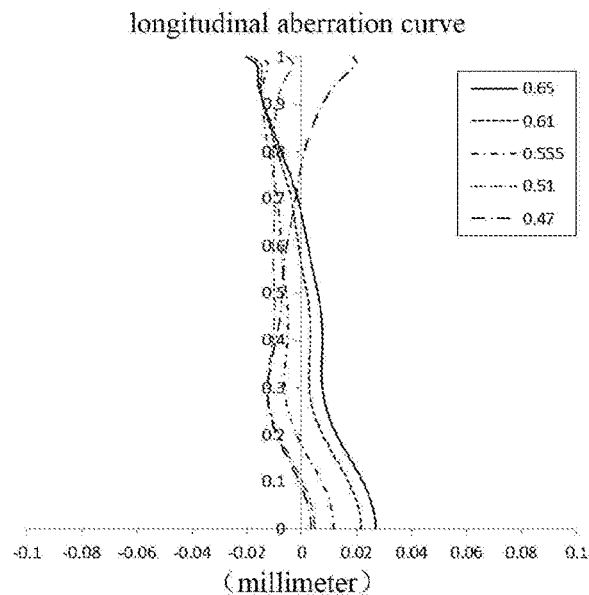
FIG. 10A illustrates a longitudinal aberration curve of the imaging lens assembly according to Embodiment 5.
Figure 10B:
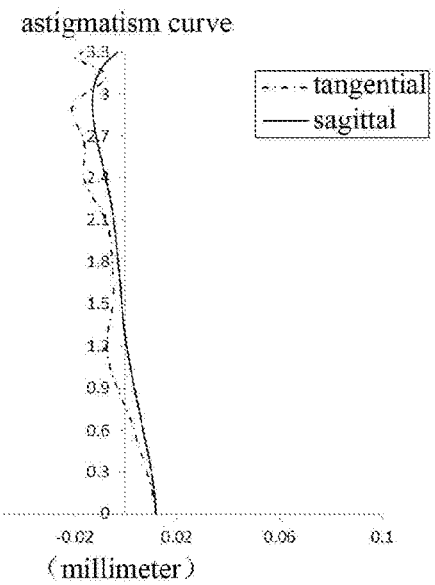
FIG. 10B illustrates an astigmatism curve of the imaging lens assembly according to Embodiment 5.
Figure 10C:
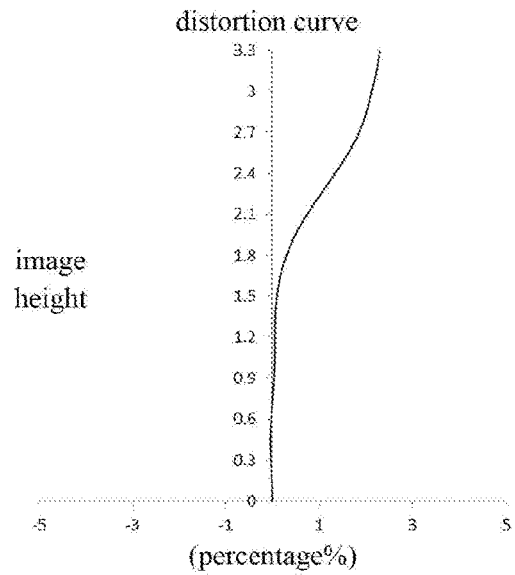
FIG. 10C illustrates a distortion curve of the imaging lens assembly according to Embodiment 5.
Figure 10D:
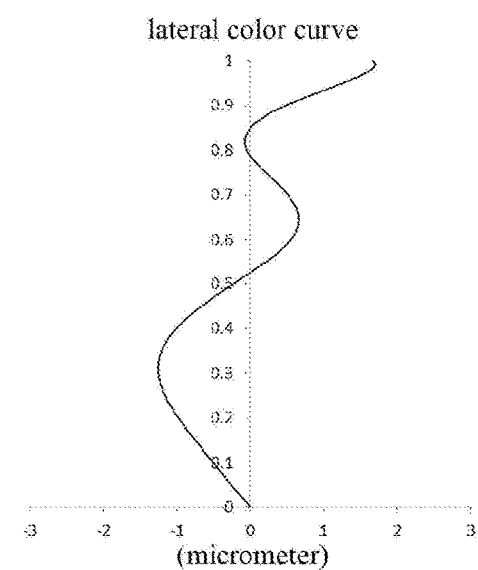
FIG. 10D illustrates a lateral color curve of the imaging lens assembly according to Embodiment 5.

FIG. 10A shows a longitudinal aberration curve of the imaging lens assembly according to Embodiment 5, representing deviations of focal points of light of different wavelengths converged after passing through an optical system. FIG. 10B shows an astigmatism curve of the imaging lens assembly according to Embodiment 5, representing a curvature of a tangential image plane and a curvature of a sagittal image plane. FIG. 10C shows a distortion curve of the imaging lens assembly according to Embodiment 5, representing amounts of distortion at different viewing angles. FIG. 10D shows a lateral color curve of the imaging lens assembly according to Embodiment 5, representing deviations of different image heights on an image plane after light passes through the imaging lens assembly. As described above and referring to FIGS. 10A to 10D, it can be seen that the imaging lens assembly according to Embodiment 5 can achieve the characteristics of miniaturization, good imaging quality, and low sensitivity.

Embodiment 6

Figure 11:
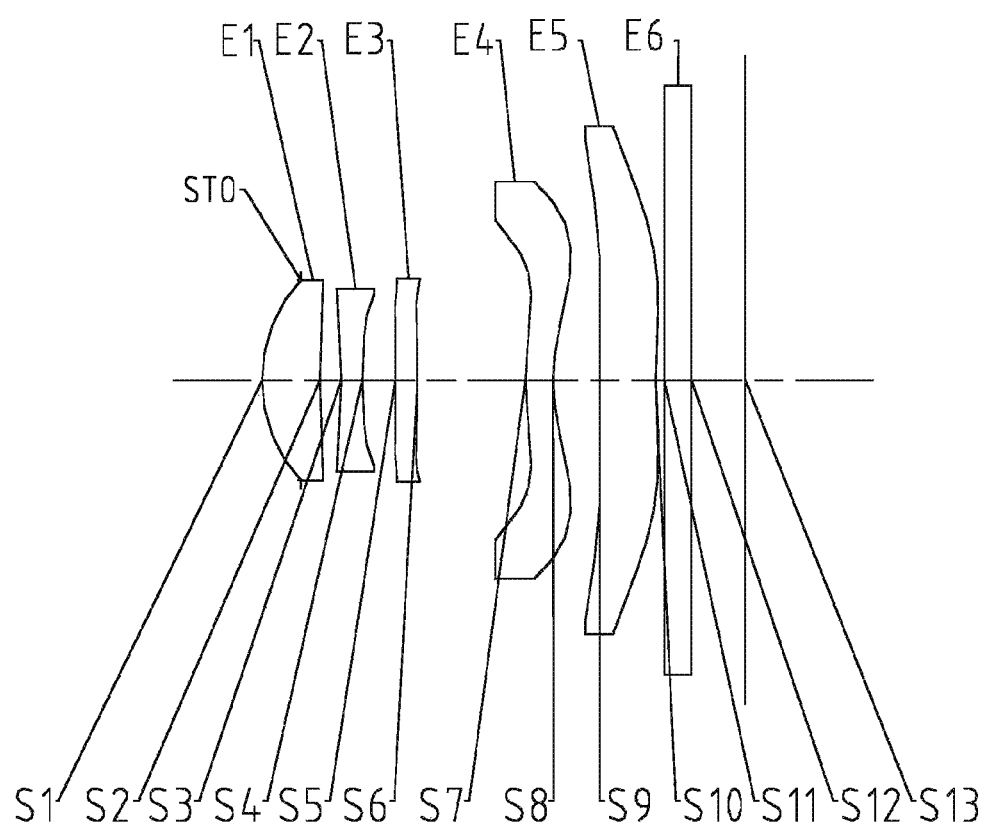
FIG. 11 illustrates a schematic structural view of an imaging lens assembly according to Embodiment 6 of the present disclosure.

The imaging lens assembly according to Embodiment 6 of the present disclosure is described below with reference to FIG. 11 to FIG. 12D. FIG. 11 illustrates a schematic structural view of an imaging lens assembly according to Embodiment 6 of the present disclosure. As shown in FIG. 11, the imaging lens assembly according to Embodiment 6 along an optical axis from an object side to an imaging side includes sequentially two imaging lens assemblies. Here, the first lens assembly includes a first lens E1, a second lens E2, and a third lens E3 arranged in sequence along the optical axis from the object side to the imaging side, and the second lens assembly includes a fourth lens E4 and a fifth lens E5 arranged in sequence along the optical axis from the object side to the imaging side.

Table 16 below shows the surface type, the radius of curvature, the thickness, the material and the conic coefficient of each lens in Embodiment 6. Table 17 shows high-order coefficients $A_4$, $A_6$, $A_8$, $A_{10}$, $A_{12}$, $A_{14}$, $A_{16}$, $A_{18}$ and $A_{20}$ applicable to each spherical or aspheric surface of each lens S1-S10 in Embodiment 6. Here, the respective aspheric surface forms may be defined by the formula (1) given in the above Embodiment 1. Table 18 shows the effective focal lengths f1 to f5 of the lenses, the effective focal length f of the imaging lens assembly, the distance TTL from the object-side surface S1 of the first lens E1 to the image plane S13 of the imaging lens assembly on the optical axis, and half of the maximum field-of-view HFOV of the imaging lens assembly of Embodiment 6.

TABLE 16

| surface number | surface type | radius of curvature | thickness | material refraction index | abbe number | conic coefficient |
|---|---|---|---|---|---|---|
| OBJ | spherical | infinite | infinite | | | |
| STO | spherical | infinite | −0.4258 | | | |
| S1 | aspheric | 1.4683 | 0.6348 | 1.55 | 56.1 | −9.7869 |
| S2 | aspheric | 21.1825 | 0.2354 | | | 99.0000 |
| S3 | aspheric | −5.4451 | 0.2300 | 1.64 | 23.5 | 0.7125 |
| S4 | aspheric | 5.1596 | 0.3624 | | | −82.9669 |
| S5 | aspheric | 14.2688 | 0.2437 | 1.67 | 20.4 | 99.0000 |
| S6 | aspheric | −50.0483 | 1.1862 | | | −99.0000 |
| S7 | aspheric | 2.6197 | 0.3041 | 1.55 | 56.1 | −4.5386 |
| S8 | aspheric | 1.7671 | 0.5157 | | | −3.0995 |
| S9 | aspheric | 10.3430 | 0.6125 | 1.64 | 23.5 | −2.5613 |
| S10 | aspheric | 5.5520 | 0.0952 | | | −88.8291 |
| S11 | spherical | infinite | 0.3000 | 1.52 | 64.2 | |
| S12 | spherical | infinite | 0.5900 | | | |
| S13 | spherical | infinite | | | | |

TABLE 17

| Surface number | A4 | A6 | A8 | A10 | A12 |
|---|---|---|---|---|---|
| S1 | 3.9105E−01 | −6.8508E−01 | 1.5736E+00 | −3.0977E+00 | 4.6725E+00 |
| S2 | −4.0284E−03 | 5.9779E−02 | −2.6972E−01 | 9.6042E−01 | −2.2396E+00 |
| S3 | 1.0186E−02 | 1.0152E−01 | −3.3517E−02 | −4.2581E−01 | 1.2888E+00 |
| S4 | 6.9879E−02 | 1.0726E−01 | −3.0311E−01 | 1.1620E+00 | −2.8741E+00 |
| S5 | −1.2953E−01 | 1.0669E−01 | −1.4059E−01 | 5.7399E−01 | −1.2193E+00 |
| S6 | −7.6873E−02 | 1.1889E−01 | −2.1690E−01 | 6.3079E−01 | −9.9941E−01 |
| S7 | −1.0012E−01 | −4.8010E−02 | 6.2744E−02 | −6.1166E−02 | 4.9087E−02 |
| S8 | −6.1333E−02 | −3.5985E−02 | 4.6006E−02 | −2.7365E−02 | 1.0159E−02 |
| S9 | −7.3110E−02 | 5.2005E−02 | −2.8514E−02 | 1.2435E−02 | −4.1028E−03 |
| S10 | −4.6777E−02 | 3.1767E−03 | 5.1824E−03 | −3.9358E−03 | 1.6109E−03 |

| Surface number | A14 | A16 | A18 | A20 |
|---|---|---|---|---|
| S1 | −4.927431937 | 3.3763E+00 | −1.3410E+00 | 2.3444E−01 |
| S2 | 3.33486289 | −3.0553E+00 | 1.5723E+00 | −3.4812E−01 |
| S3 | −1.886534514 | 1.5203E+00 | −6.2199E−01 | 8.9603E−02 |
| S4 | 4.677031086 | 4.5773E+00 | 2.4657E+00 | −5.5150E−01 |
| S5 | 1.827854006 | −1.8044E+00 | 1.0175E+00 | −2.5035E−01 |
| S6 | 1.079442954 | −7.8656E−01 | 3.5570E−01 | −7.8761E−02 |
| S7 | −0.027798623 | 9.7394E−03 | −1.8271E−03 | 1.3894E−04 |
| S8 | −0.002570854 | 4.2801E−04 | −4.0305E−05 | 1.5230E−06 |
| S9 | 0.000912179 | −1.2445E−04 | 9.3579E−06 | −2.9779E−07 |
| S10 | −0.000387498 | 5.3577E−05 | −3.9188E−06 | 1.1707E−07 |

TABLE 18

| | | | |
|---|---|---|---|
| f1(mm) | 2.86 | f(mm) | 5.48 |
| f2(mm) | −4.08 | TTL(mm) | 5.31 |
| f3(mm) | 16.70 | HFOV(°) | 30.6 |
| f4(mm) | −11.38 | | |
| f5(mm) | −19.61 | | |

Figure 12A:
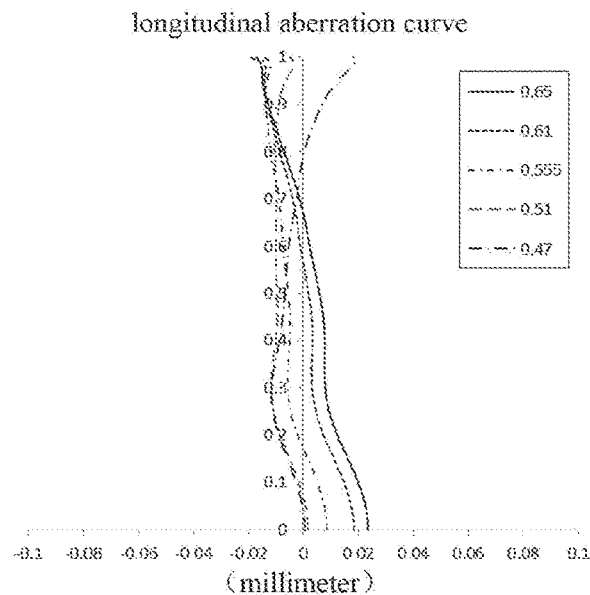
FIG. 12A illustrates a longitudinal aberration curve of the imaging lens assembly according to Embodiment 6.
Figure 12B:
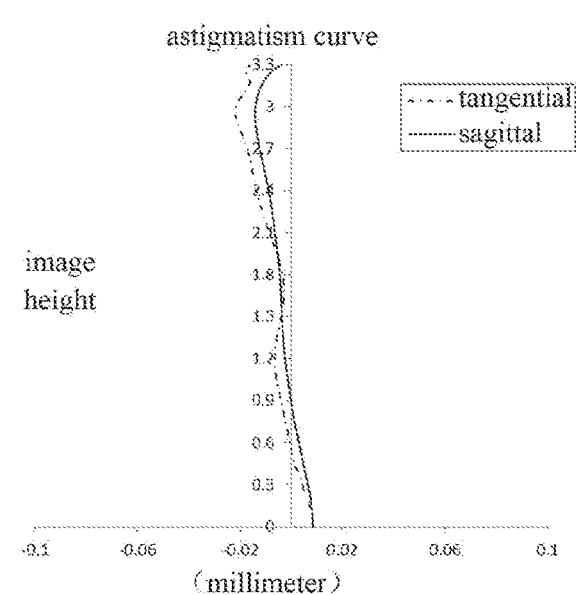
FIG. 12B illustrates an astigmatism curve of the imaging lens assembly according to Embodiment 6.
Figure 12C:
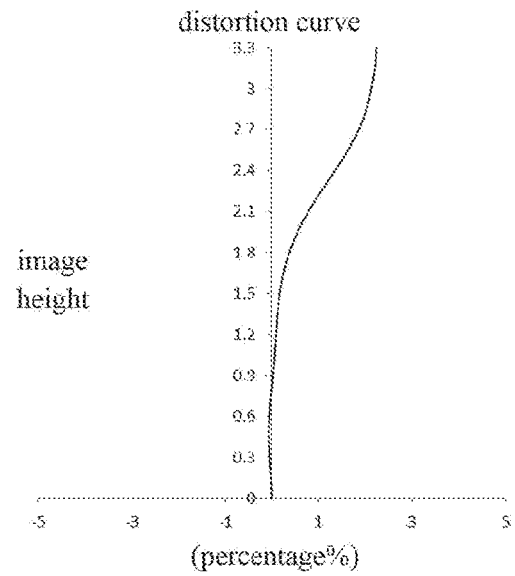
FIG. 12C illustrates a distortion curve of the imaging lens assembly according to Embodiment 6.
Figure 12D:
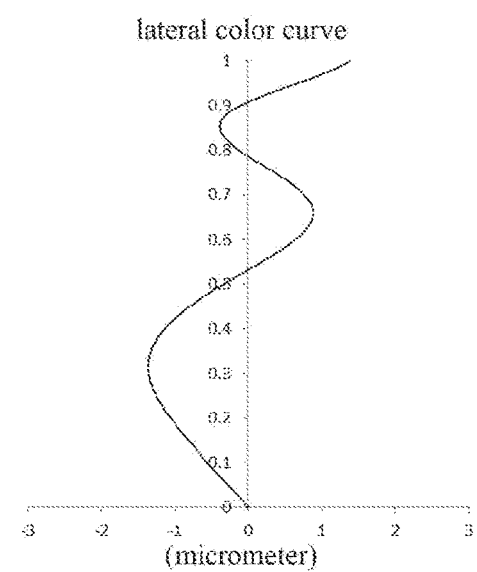
FIG. 12D illustrates a lateral color curve of the imaging lens assembly according to Embodiment 6.

FIG. 12A shows a longitudinal aberration curve of the imaging lens assembly according to Embodiment 6, representing deviations of focal points of light of different wavelengths converged after passing through an optical system. FIG. 12B shows an astigmatism curve of the imaging lens assembly according to Embodiment 6, representing a curvature of a tangential image plane and a curvature of a sagittal image plane. FIG. 12C shows a distortion curve of the imaging lens assembly according to Embodiment 6, representing amounts of distortion at different viewing angles. FIG. 12D shows a lateral color curve of the imaging lens assembly according to Embodiment 6, representing deviations of different image heights on an image plane after light passes through the imaging lens assembly. As described above and referring to FIGS. 12A to 12D, it can be seen that the imaging lens assembly according to Embodiment 6 can achieve the characteristics of miniaturization, good imaging quality, and low sensitivity.

In summary, referring to Table 1 to Table 18, the parameters of Embodiment 1 to Embodiment 6 may respectively satisfy the relationships shown in Table 19 below.

TABLE 19

| Formula | Embodiment | | | | | |
|---|---|---|---|---|---|---|
| | 1 | 2 | 3 | 4 | 5 | 6 |
| f/f45 | −0.58 | −0.59 | −0.73 | −0.74 | −0.77 | −0.78 |
| f2/f4 | 0.57 | 0.62 | 0.49 | 0.44 | 0.38 | 0.36 |
| R3/R4 | −0.88 | −0.62 | −0.72 | −0.78 | −0.97 | −1.06 |
| f/R9 | 0.65 | 0.70 | 0.81 | 0.73 | 0.59 | 0.53 |
| f/f3 | 0.23 | 0.09 | 0.24 | 0.27 | 0.31 | 0.33 |
| f/f5 | 0.14 | 0.11 | −0.06 | −0.14 | −0.24 | −0.28 |
| BFL/TTL | 0.25 | 0.23 | 0.20 | 0.19 | 0.19 | 0.19 |

TABLE 19-continued

| Formula | Embodiment | | | | | |
|---|---|---|---|---|---|---|
| | 1 | 2 | 3 | 4 | 5 | 6 |
| T23/T34 | 0.45 | 0.44 | 0.35 | 0.35 | 0.32 | 0.31 |
| TTL/f | 0.97 | 0.97 | 0.97 | 0.97 | 0.97 | 0.97 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An imaging lens assembly, along an optical axis from an object side to an imaging side comprising sequentially a first lens assembly and a second lens assembly,
the first lens assembly having a positive refractive power; and
the second lens assembly having a negative refractive power,
wherein, the first lens assembly along the optical axis from the object side to the imaging side comprises sequentially:
a first lens, having a positive refractive power, and an object-side surface of the first lens being a convex surface;
a second lens, having a negative refractive power; and
a third lens, having a positive refractive power,
wherein, the second lens assembly along the optical axis from the object side to the imaging side comprises sequentially:
a fourth lens, having a negative refractive power; and
a fifth lens, having a negative refractive power, and an object-side surface of the fifth lens being a convex surface at a paraxial position, and
an effective focal length f of the imaging lens assembly and a combined focal length f45 of the fourth lens and the fifth lens satisfy: $-1.0<f/f45\leq-0.5$,
wherein an air spacing T23 between the second lens and the third lens on the optical axis and an air spacing T34 between the third lens and the fourth lens on the optical axis satisfy: $T23/T34\leq0.5$, and
a radius of curvature R3 of an object-side surface of the second lens and a radius of curvature R4 of an image-side surface of the second lens satisfy: $-1.5<R3/R4<-0.5$.

2. The imaging lens assembly according to claim 1, wherein an effective focal length f2 of the second lens and an effective focal length f4 of the fourth lens satisfy: $0.3<f2/f4<1.0$.

3. The imaging lens assembly according to claim 1, wherein the effective focal length f of the imaging lens assembly and an effective focal length f3 of the third lens satisfy: $|f/f3|<0.5$.

4. The imaging lens assembly according to claim 1, wherein the effective focal length f of the imaging lens assembly and an effective focal length f5 of the fifth lens satisfy: $|f/f5|<0.5$.

5. The imaging lens assembly according to claim 4, wherein the effective focal length f of the imaging lens assembly and a radius of curvature R9 of the object-side surface of the fifth lens satisfy: $f/R9<1.0$.

6. The imaging lens assembly according to claim 1, wherein a distance BFL from an image-side surface of the fifth lens to an image plane on the optical axis and a distance TTL from the object-side surface of the first lens to the image plane on the optical axis satisfy: $0.15<BFL/TTL<0.3$.

7. The imaging lens assembly according to claim 6, wherein the effective focal length f of the imaging lens assembly and a distance TTL from the object-side surface of the first lens to the image plane on the optical axis satisfy: $TTL/f<1.0$.

8. An imaging lens assembly, along an optical axis from an object side to an imaging side comprising sequentially a first lens assembly and a second lens assembly,
the first lens assembly having a positive refractive power; and
the second lens assembly having a negative refractive power,
wherein, the first lens assembly along the optical axis from the object side to the imaging side comprises sequentially:
a first lens, having a positive refractive power, and an object-side surface of the first lens being a convex surface;
a second lens, having a negative refractive power; and
a third lens, having a positive refractive power,
wherein, the second lens assembly along the optical axis from the object-side to the imaging side comprises sequentially:
a fourth lens, having a negative refractive power; and
a fifth lens, having a negative refractive power, and an object-side surface of the fifth lens being a convex surface at a paraxial position, and
a distance BFL from an image-side surface of the fifth lens to an image plane on the optical axis and a distance TTL from the object-side surface of the first lens to the image plane on the optical axis satisfy: $0.15<BFL/TTL<0.3$;
an effective focal length f of the imaging lens assembly and an effective focal length f5 of the fifth lens satisfy: $|f/f5|<0.5$,
wherein the effective focal length f of the imaging lens assembly and a radius of curvature R9 of the object-side surface of the fifth lens satisfy: $f/R9<1.0$, and
a radius of curvature R3 of an object-side surface of the second lens and a radius of curvature R4 of an image-side surface of the second lens satisfy: $-1.5<R3/R4<-0.5$.

9. The imaging lens assembly according to claim 8, wherein an effective focal length f2 of the second lens and an effective focal length f4 of the fourth lens satisfy: $0.3<f2/f4<1.0$.

10. The imaging lens assembly according to claim 8, wherein the effective focal length f of the imaging lens assembly and an effective focal length f3 of the third lens satisfy: $|f/f3|<0.5$.

11. An imaging lens assembly, along an optical axis from an object side to an imaging side comprising sequentially a first lens assembly and a second lens assembly,
the first lens assembly having a positive refractive power; and
the second lens assembly having a negative refractive power,
wherein, the first lens assembly along the optical axis from the object side to the imaging side comprises sequentially:
a first lens, having a positive refractive power, and an object-side surface of the first lens being a convex surface;
a second lens, having a negative refractive power; and
a third lens, having a positive refractive power,
wherein, the second lens assembly along the optical axis from the object side to the imaging side comprises sequentially:
a fourth lens, having a negative refractive power; and
a fifth lens, having a negative refractive power, and an object-side surface of the fifth lens being a convex surface at a paraxial position, and an effective focal length f of the imaging lens assembly and a distance TTL from the object-side surface of the first lens to an image plane on the optical axis satisfy: $TTL/f < 1.0$, wherein an air spacing T23 between the second lens and the third lens on the optical axis and an air spacing T34 between the third lens and the fourth lens on the optical axis satisfy: $T23/T34 < 0.5$, and a radius of curvature R3 of an object-side surface of the second lens and a radius of curvature R4 of an image-side surface of the second lens satisfy: $-1.5 < R3/R4 < -0.5$.

12. The imaging lens assembly according to claim 11, wherein an effective focal length f2 of the second lens and an effective focal length f4 of the fourth lens satisfy: $0.3 < f2/f4 < 1.0$.

13. The imaging lens assembly according to claim 11, wherein the effective focal length f of the imaging lens assembly and an effective focal length f3 of the third lens satisfy: $|f/f3| < 0.5$.

14. The imaging lens assembly according to claim 13, wherein the effective focal length f of the imaging lens assembly and a radius of curvature R9 of the object-side surface of the fifth lens satisfy: $f/R9 < 1.0$.

15. The imaging lens assembly according to claim 11, wherein the effective focal length f of the imaging lens assembly and an effective focal length f5 of the fifth lens satisfy: $|f/f5| < 0.5$.

* * * * *